United States Patent [19]
Kojima et al.

[11] Patent Number: 6,003,391
[45] Date of Patent: Dec. 21, 1999

[54] TRANSMISSION MECHANISM FOR A WORKING VEHICLE

[75] Inventors: Masaaki Kojima; Masashi Inanaga; Akinobu Rugou, all of Amagasaki, Japan

[73] Assignee: Kanzaki Kokyukoki Mfg. Co., Ltd., Japan

[21] Appl. No.: 09/145,022

[22] Filed: Sep. 1, 1998

[30] Foreign Application Priority Data

Sep. 1, 1997 [JP] Japan ..................................... 9-236292
Sep. 19, 1997 [JP] Japan ..................................... 9-255646

[51] Int. Cl.$^6$ ............................ F16H 37/00; B60K 17/28
[52] U.S. Cl. ........................... 74/15.66; 74/15.63; 74/11; 74/15.2; 192/3.57; 180/53.1
[58] Field of Search .................................. 192/3.57, 4 A; 74/11, 15.63, 15.66, 15.2; 180/53.1, 248, 249

[56] References Cited

U.S. PATENT DOCUMENTS

| 5,123,293 | 6/1992 | Umemoto et al. | 74/333 |
| 5,339,703 | 8/1994 | Tanaka | 74/15.4 |

FOREIGN PATENT DOCUMENTS

| 5-26686 | 6/1986 | Japan . | |
| 6-297971 | 4/1993 | Japan . | |
| 7-117507 | 10/1993 | Japan . | |
| 2036205 | 6/1980 | United Kingdom | 74/15.66 |

*Primary Examiner*—Charles A. Marmor
*Assistant Examiner*—Tisha D. Waddell
*Attorney, Agent, or Firm*—Sterne, Kessler, Goldstein & Fox, P.L.L.C.

[57] ABSTRACT

A transmission mechanism having a PTO transmission system and a traveling transmission system and used for a working vehicle, which is so constructed that a input shaft 8 is coaxially freely perforated through a hollow traveling clutch shaft 13, both ends of input shaft 8 projects from the traveling clutch shaft 13, one projecting portion is journalled between a bearing wall 1b of a front transmission casing 1 and a front bearing plate 4 for covering an opening at the front end of the wall 1b, and a selecting device A including a forward and rearward movement switching clutch B, as an embodiment of an auxiliary speed change device, is disposed at this projecting portion. At the front bearing plate 4 is formed an oil relaying unit 4a in which an oil passage for the forward and rearward movement switching clutch B is bored, so that an oil passage bored in a thick portion 1d of the outer wall connects through a hydraulic control valve unit 35 attached to the outer wall of the front transmission casing 1 with the oil passage of oil relaying unit 4a without need of piping. Meanwhile, a PTO clutch 9 is coaxially disposed with the input shaft 8 sequentially to the projection thereof, between the input shaft 8 and the PTO clutch shaft 9 is disposed a PTO assembly of combination of a hydraulic PTO clutch D and hydraulic PTO brake E, an annular groove 53c is formed on the outer peripheral surface, a rear surface portion of the drum 53 is rotatably mounted to a bearing wall 2a of the rear transmission casing 2, and abutting portion 53e is formed on the inner periphery of the brake drum 53 and made possible to abut against a stopper pin 61 projecting into a recess 2f at the bearing wall 2, thereby allowing the idling of brake drum 53 in a predetermined angle with respect to the bearing wall 2a.

17 Claims, 11 Drawing Sheets

TRANSMISSION MECHANISM FOR A WORKING VEHICLE

BACKGROUND OF THE INVENTION

1. Field of the Invention

This invention relates to a transmission mechanism which comprises a traveling transmission system and a PTO transmission system and used for a working vehicle, such as a tractor, and more particularly to a transmission mechanism which is provided in the traveling transmission system with an auxiliary transmission having at least two transmission stages, such as a forward and rearward movement switching and a high-low speed switching, and in the PTO transmission system with a hydraulic PTO clutch and a PTO brake for braking a PTO shaft following disengagement of PTO clutch.

2. Description of Related Art

A conventional transmission mechanism for a working vehicle, such as a tractor, has a traveling transmission system having both a multi-stage transmission device and a PTO system transmission mechanism. In other words, a common input shaft transmits the power from an engine output shaft and is used to drive both the traveling transmission system and the PTO transmission system by using gears and the like. Conventionally, however, the traveling system transmission shaft and the PTO system transmission shaft are disposed in parallel to each other so that the separate spaces for transmission shafts of traveling and PTO systems are required to be axially disposed. In a case that the traveling system transmission device is the multistage transmission device, the disposing space thereof needs to be a considerably larger in part, whereby the transmission mechanism provided with both the traveling and PTO systems, the transmission shafts requires a further larger disposing space to that extent, and a housing for containing therein the mechanism must be of a large size.

Also, such the transmission mechanism for the working vehicle like the tractor is provided with both the traveling system and PTO system having the multistage speed change device, is well-known to be provided between the engine and the multistage speed change device with an auxiliary speed change device provided with at least two speed-change stages. For example, a transmission mechanism disclosed in the Japanese Patent Publication No. Hei 5-26686 or the Japanese Patent Laid-Open No. Hei 7-117507 is provided between the engine and the main multistage speed change device for the changing the speed of driving wheels with the speed change device for forward and rearward movement switching and for high-low speed changing.

The conventional traveling transmission mechanism is complicated in construction of assembling the main multistage speed change device, forward and rearward movement switching device and auxiliary high-low speed change device, in the same chamber, on the same shaft or on each shaft to be engageable with each other. For example, even when only the multistage speed changing device is intended to be applied with the maintenance work, both the multistage speed change device and auxiliary speed change device must be detached so that it is difficult that the auxiliary speed change device is detachably mounted.

In a case that such the auxiliary speed change device comprises a hydraulic clutch, supply structure for operating oil is complicated so that it is difficult to construct the hydraulic clutch to be easily detachably mountable. For example, the hydraulic clutch disclosed in the Japanese Patent Laid-Open No. Hei 6-297971 (in which the clutch is for PTO power change over), a valve for supplying the operating oil is built in a housing and a hydraulic oil pipe is interposed between the valve and the hydraulic clutch, whereby the piping must be removed when the hydraulic clutch is detached or mounted.

Meanwhile, such a conventional transmission mechanism for the working vehicle, which is provided with a PTO clutch of multistage plates and of hydraulic operation system and a brake mechanism for preventing inertial rotation are juxtaposed in the downstream side, is disclosed in, for example, the Japanese Patent Laid-Open No. Hei 6-297971, in which the brake mechanism is so constructed that braked members assembled integrally with the PTO clutch piston come into press contact with one disc-like braking member freely fitted onto the transmission shaft in the downstream side of PTO clutch, so as to brake the downstream side transmission shaft; the PTO system transmission shaft (or the PTO shaft itself). Also, the braking members are freely fitted on the PTO system transmission shaft, but is admitted to be idle in a predetermined angle (rotation reversely to the driving direction), because when the PTO shaft does not operate at all during the disengagement of PTO clutch, the PTO shaft at the working vehicle side and the transmission mechanism at the working machine side are not well connected.

The conventional PTO transmission system has the brake mechanism which brings one disc-like braked member in press contact with one disc-like braking mechanism, so that, when in comparison with the multiple disc system, an impact increases and the durability deteriorates. The braking mechanism is freely fitted onto the shaft at the downstream side of PTO clutch and the braked members are built in the clutch piston, whereby the braked members and braking members of the brake mechanism must be separated. Furthermore, an operation quantity of the braked member is restricted to the stroke of the clutch piston, the stroke must be adjusted every assembly so as to take much time. The idling allowable mechanism in the predetermined angle of the PTO brake is complicated in processing at a wall portion of transmission casing and expensive to produce.

SUMMARY OF THE INVENTION

A first object of the invention is to provide a transmission mechanism for a working vehicle, which has a PTO transmission system and a traveling transmission system and concentrically disposes the transmission shafts of both the systems, thereby reducing the auxiliary space required to dispose the transmission systems.

A second object of the invention is to provide a transmission mechanism which includes in the traveling transmission system an auxiliary speed change device which is provided with at least two speed changing stages for selecting forward and rearward movement and high and low speed and which can be easily built in a housing so as to be detachably mountable independently of other speed change mechanisms, thereby avoiding complicated maintenance work.

A third object of the invention is to provide a transmission mechanism which, in a case that the auxiliary speed change device in the traveling transmission system uses a hydraulic clutch for reliability or smooth operation of engagement or disengagement of the clutch, the piping for operating oil applied thereto is facilitated or deleted so as to form compact oil passages in a wall of housing, thereby providing a compact traveling transmission system which is inexpensive to produce and easy to maintain.

A fourth object of the invention is to provide a transmission mechanism including in the PTO transmission system a PTO brake which is disposed together with the PTO clutch to prevent a PTO system transmission shaft from rotating together therewith and which is provided with a drum so that braking members can be retained thereto in plurality and under a predetermined condition to thereby form a durable brake construction operable smoothly and reliably.

A fifth object of the invention is to provide a transmission mechanism, in which the PTO brake having the drum is made detachably mountable with easy construction and integrally with the PTO clutch onto the wall of housing so as to enable a PTO assembly integral with the PTO clutch and PTO brake to be detachably mounted, thereby avoiding separation of braking members of PTO brake from the braked members thereof to facilitate assembly and maintenance.

A sixth object of the invention is to provide a transmission mechanism, in which the PTO brake including the drum can easily complete the idling allowable mechanism of braking members with respect to the braked members by means of a simple construction smaller in the number of parts, thereby providing a compact idling allowable mechanism which is easy to assemble and maintain and inexpensive to produce.

A seventh object of the invention is to provide a transmission mechanism, in which the PTO clutch and PTO brake are hydraulic and can be concentrically juxtaposed when the PTO assembly is constructed, so as to be compact and integrally mountable to dismountable, thereby facilitating communication of the operating oil chamber for the PTO assembly with the oil relaying unit formed in the housing.

With those and other objects in view, the invention consists in the methods and the construction hereinafter fully described, illustrated in the accompanying drawings, and set forth in the claims hereto appended, it being understood that various changes in the operation, form, proportion and minor detailed of construction, within the scope of the claims, may be resorted without departing from the spirit of the invention or sacrificing any of the advantages thereof.

DETAILED DESCRIPTION OF THE PREFERRED EMBODIMENTS

Figure 1:
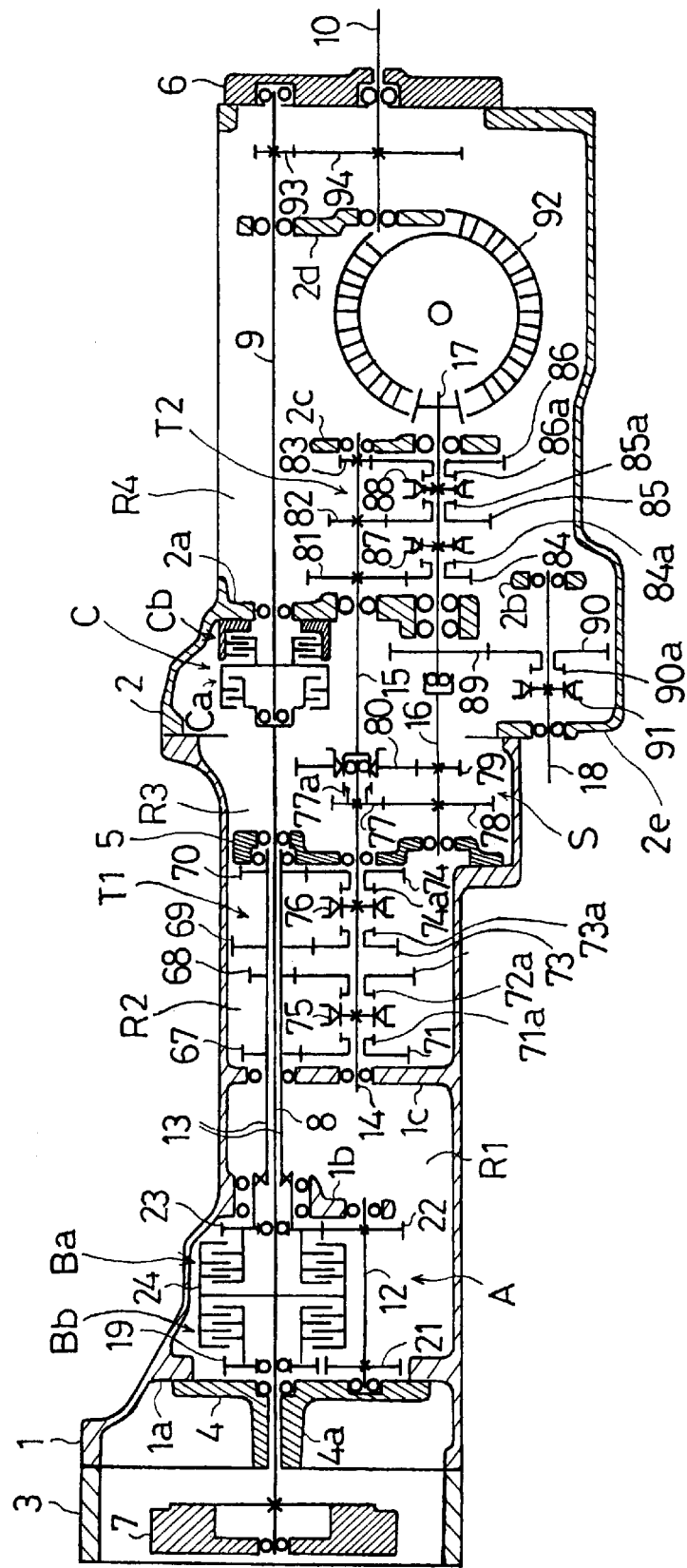
FIG. 1 is a skeleton diagram of an entire transmission adopting a PTO transmission device for a working vehicle according to the present invention.
Figure 2:
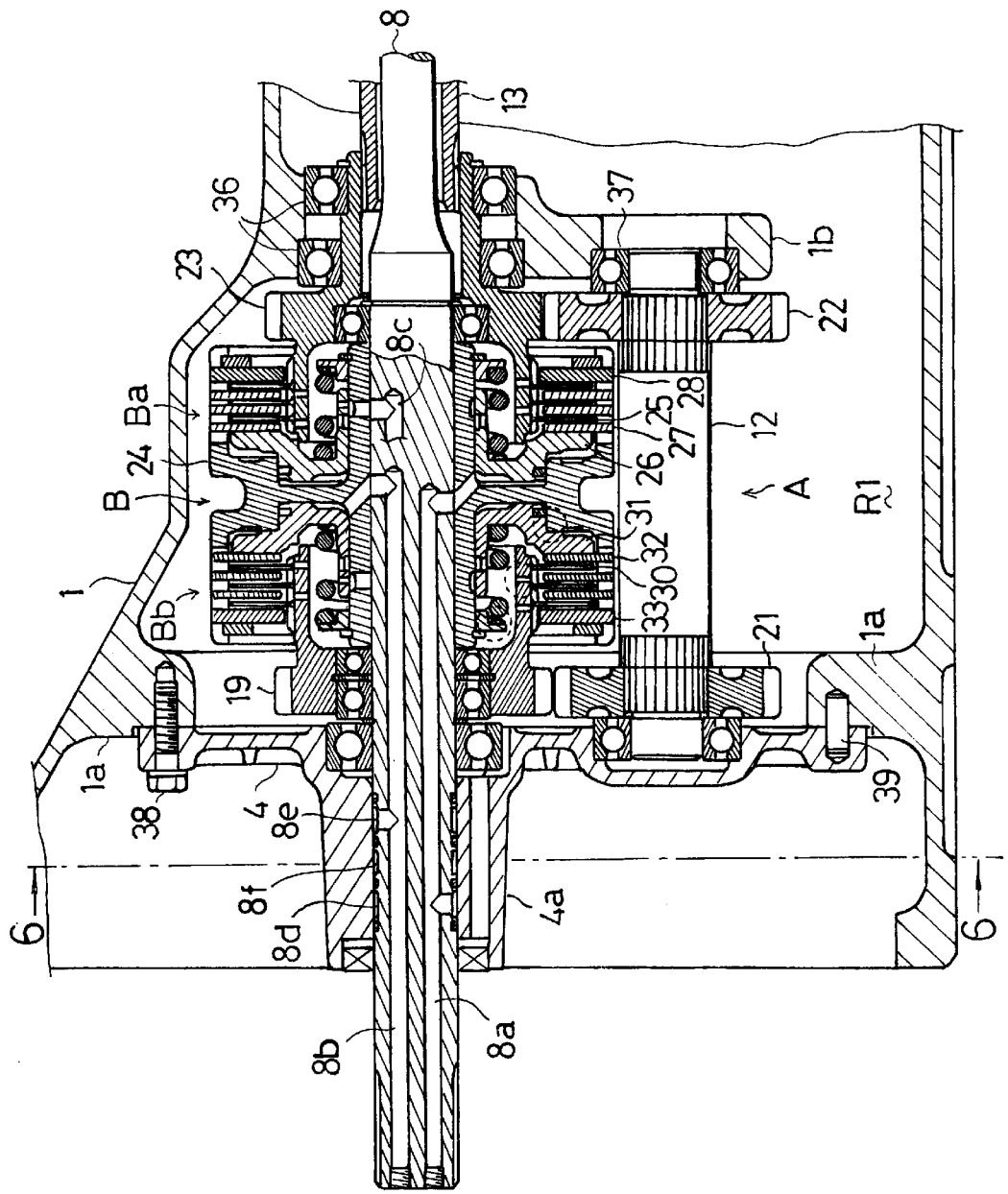
FIG. 2 is a partially sectional side view of a front transmission casing showing the disposal of a forward and rearward movement selecting device A, including a sectional interior view of a forward and rearward movement switching clutch B.

FIG. 1 is a structure of a whole transmission mechanism for a working vehicle, such as a tractor. Firstly, a housing is described in structure. The housing comprises a front transmission casing 1 and a rear transmission casing 2 which are longitudinally joined. The rear transmission casing 2 is closed at the rear opening by a rear bearing cover 6. The front transmission casing 1 is open at the front end and rear end thereof, the front opening being integrally jointed with a flywheel housing 3 in a manner of longitudinally perforating. The rear transmission casing 2 also is open at the front end and rear end thereof, the front end opening communicating with the rear end opening of the front transmission casing 1.

Within the front transmission casing 1, a boss 1a for fixing a front bearing plate projects inwardly of the casing and slightly rearwardly of the front opening, a front bearing plate 4 is fixed to the front of boss 1a so as to close the front opening of the front transmission casing 1 in an oil tight manner, and lubricating oil is filled only in a chamber behind the bearing plate 4. Furthermore, within the front transmission casing 1, a bearing wall 1b is formed which projects inwardly of the casing 1 and slightly rearwardly of the front bearing plate 4, and a partition 1c formed slightly rearwardly of the bearing wall 1b longitudinally divides the interior of front transmission casing 1 into a first chamber R1 and a second chamber R2, the first chamber R1 being formed between the front bearing plate 4 and the partition 1c.

Also, an intermediate bearing plate 5 is connected to a boss provided rearwardly of the partition 1c and slightly frontward of the rear end opening so as to form the second chamber R2 between the partition 1c and the intermediate bearing plate 5 in the front transmission casing 1c. Furthermore, within the rear transmission casing 2, a bearing wall 2a is formed slightly rearwardly of the front opening of casing 2, and in the front transmission casing 1 and rear transmission casing 2, a third chamber R3 is formed between the intermediate bearing plate 5 and the bearing wall 2a, and a fourth chamber 4R is formed from the bearing wall 2a to the rear end (a closed portion by a rear bearing cover 6) within the rear transmission casing 2.

The transmission mechanism shown in FIG. 1 comprises a traveling transmission system and the PTO transmission system of the present invention, which are both disposed in the housing constructed as the above-mentioned. Firstly, explanation will be given on a schematic construction of the entire traveling transmission system. Between the bearing wall 1b and the intermediate bearing plate 5 is journalled a clutch shaft 13; traveling transmission system shaft, and a middle portion thereof is journalled by the bearing wall 1c. The traveling clutch shaft 13 is hollow to freely insert therein an input shaft 8. In the first chamber R1 and between the front bearing plate 4 and the bearing wall 1b is disposed and on the input shaft 8 is disposed a forward and rearward movement switching clutch B of hydraulic clutch type, so that a cylinder casing 24 thereof rotates integrally with the input shaft 8, the forward and rearward switching clutch B being provided at the rear with a forward movement clutch unit Ba and at the front with a rearward movement clutch unit Bb. When the forward movement clutch Ba engages, the input shaft 8 is directly connected with the traveling clutch shaft 13 so that the transmission system, in which the power of input shaft 8 is directly transmitted to the traveling clutch shaft 13 through the forward movement clutch unit Ba 8 (in other words, it is transmitted to the forward rotation), is designated as a first transmission system (forward movement transmission system).

An idle shaft 11 (refer to FIGS. 4 and 6) is journalled onto the front bearing plate 4, and an intermediate shaft 12 for rearward movement is journalled between the front bearing plate 4 and the bearing wall 1b, in parallel to the idle shaft 11, and a gear train is disposed so as to form a second transmission system (transmission system for rearward movement) for transmitting the power from the input shaft 8 to the traveling clutch shaft 13 through the idle shaft 11 and intermediate shaft 12. When the rearward movement clutch unit Bb engages, the power is transmitted from the input shaft 8 to the idle shaft 11 so that the traveling clutch shaft 13 is rotated reversely to the first transmission system.

As described above, the first and second transmission systems are included between the first bearing plate 4 and the bearing wall 1b so as to form a selecting device A selectable of one of both the transmission systems by the forward and rearward movement switching clutch B, the selecting device A being an embodiment of the auxiliary speed change device having at least two speed change stages. Instead of the selecting device A, for example, a high and low speed selecting mechanism S to be discussed below may be assembled in this position as the auxiliary speed change device of the present invention.

An embodiment of the forward and rearward movement selecting device A and the built-in thereof into the front transmission casing 1 is described below. A first traveling speed change shaft 1,4 is disposed in parallel to the traveling clutch shaft 13 in the second chamber R2 and journalled to the bearing wall 1c and intermediate bearing plate 5, and gear trains and clutches constructing a main speed change mechanism T1 of four speed traveling are disposed between the traveling clutch shaft 13 and the first traveling speed change shaft 14.

In a flywheel housing 3 is disposed a flywheel 7 directly connected to the engine output shaft, the flywheel 7 connecting with the front end of input staff 8, in other words, the input shaft 8 rotating integrally with the engine output shaft.

As the above-mentioned, the selecting device A is constructed which has the forward movement transmission system (the first transmission system) and the rearward movement transmission system (the second transmission system) for directly transmitting the power from the input shaft 8 to the traveling clutch shaft 13 so as to be selective of one both the transmission systems by means of the forward and rearward movement switching clutch B and which can be formed as one assembly and built in the transmission casing. In addition, both the clutches Ba and Bb of the selecting device A are disengaged so as to enable the traveling transmission system to be put in a neutral state by use of a hydraulic control valve 35 shown in FIG. 5.

Next, explanation will be given on a main traveling speed change mechanism T1 of 4-stages constructed between the traveling clutch shaft 13 and the first traveling speed change shaft 14 in the second chamber R2.

In the same chamber, onto the traveling clutch shaft 13 are longitudinally fixed a 2-speed driving gear 67, a 1-speed driving gear 68, a 4-speed driving gear 69, and a 3-speed driving gear 70. A 2-speed driven gear 71, a 1-speed driven gear 72, a 4-speed driven gear 73 and 3-speed driven gear 74, are freely fitted onto the first traveling speed change shaft and are permanently engaged with driving gears 67, 68, 69 and 70, respectively.

The driven gears 71 and 72 on the first traveling speed change shaft 14 are oppositely provided with clutch teeth 71a and 72a respectively. A clutch member 75 is disposed between both the clutch teeth 71a and 72a in relation of being non-relatively-rotatable and axially slidable with respect to the first traveling speed change shaft 14 and axially slidable, so as to be switchable to engage with the clutch teeth 71a and 72a and not to engage with either teeth.

Similarly, the driven gears 73 and 74 are oppositely provided with clutch teeth 73a and 74a respectively, and a clutch member 76 is disposed onto the first traveling speed change shaft 14 between the clutch teeth 73a and 74a in relation of being non-relatively-rotatable and freely axially slidable, so as to be switchable into an engaging condition with the clutch teeth 73a or 74a and in a disengaging condition with either clutch teeth 73a or 74a. The main traveling speed change mechanism T1 allows the clutch member 75 or 76 to engage with any one of the clutch teeth 71a, 72a, 73a and 74a by use of one main speed change level (not shown), so that the driven gear, to which the clutch teeth are attached, is engaged with the first traveling speed change shaft 14, thereby driving the first traveling speed change shaft 14 in the speed reducing ratio on the basis of the gear trains.

The first traveling speed change shaft 14 extends rearwardly of the intermediate bearing plate 5 and an intermediate shaft 16 for low speed is disposed within the third chamber R3 in parallel to the first traveling speed change shaft 14 and is journalled at the front end to the intermediate bearing plate 5. A second traveling speed change shaft 15 is disposed coaxially of the shaft 14 and rearwardly of the rear end thereof, freely fitted at the front end onto the rear end of the first traveling speed change shaft 14, and journalled at the middle portion onto the bearing wall 2a and at the rear end onto the bearing wall 2c.

Within the third chamber R3, gear trains and clutches constituting the high and low speed switching mechanism S through the low speed intermediate shaft 16 are disposed between the first traveling speed change shaft 14 and the second traveling speed change shaft 15. Namely, a driving gear 77 for switching high and low speed is fixed onto the rear end of the first traveling speed change shaft 14 and clutch teeth 77a are fixed onto the side surface of the driving gear 77, which permanently engages with a first intermediate gear 78 fixed onto the intermediate shaft 16, and a second intermediate gear 79 is fixed thereto. A high and low speed switching, slide gear 80 is fitted onto the front end of the second traveling speed change shaft 15 in relation of being non-relatively-rotatable and freely longitudinally slidable.

The slide gear 80, as shown in FIG. 1, disengages from the clutch teeth 77a and engages with the second intermediate gear 79 at the rear at the rear end of the longitudinally sliding area, and engages with the clutch teeth 77a so as to be to put in the disengaging condition from the second intermediate gear 79 at the front end of the same area. The former is the low speed condition of transmitting the power from the first traveling speed change shaft 14 to the second traveling speed change shaft 15 through the driving gear 77, first intermediate gear 78, second intermediate gear 79 and slide gear 80, and the latter is a high speed condition where the first traveling speed change shaft 14 is directly connected with the second traveling speed change shaft 15 so as to directly transmit a driving force of the first traveling speed change shaft 14 to the second traveling speed change shaft 15.

A traveling output shaft 17 is journalled in parallel to the second traveling speed change shaft 15 between the bearing wall 2a in the fourth chamber R4, and gear trains and clutches constituting the substitute 3-stage traveling speed change mechanism T2 are disposed between the shafts 16 and 17. In other words, a substitute 3-speed driving gear 84, a substitute 2-speed driving gear 82 and a substitute 1-speed driving gear 83 are fixed onto the second traveling speed change shaft 15 sequentially form the front and always engage with a substitute 3-speed driven gear 84, a substitute 2-stage driven gear 85 and a substitute 1-stage driven gear 86 respectively.

Clutch teeth 84a are attached to the side surface of the driven gear 84 and clutch teeth 85a and 86a are attached to the opposite surface of the driven gears 85 and 86 respectively. Furthermore, a clutch member 87 is longitudinally slidably fitted onto the traveling output shaft 17 between the clutch teeth 84a and the driven gear 85 respectively, and a clutch member 88 is similarly fitted onto the traveling output shaft 17 between the clutch teeth 85a and 86a. The substitute traveling speed change mechanism T2 allows the clutch member 87 and 88 to be longitudinally slidable by use of, for example, one substitute speed change lever, so as to switch the clutch member 87 and 88 to engage with one of the clutch teeth 84a, 85a and 86a, and to be put in the neutral state non-engaging with any one of them.

In addition, the traveling output shaft 17, in the second chamber R2, extends at the front end thereof forwardly of the bearing wall 2a and is freely fitted onto the rear end of the low speed intermediate shaft 16 and extends at the rear end rearwardly of the bearing wall 2c so as to connect with a rear wheel differential mechanism 92 disposed between the bearing walls 2c and 2d within the fourth chamber R4.

In the above-mentioned construction, the engine output shaft (flywheel 7) rotates to drive the traveling clutch shaft 13 in the forward to rearward movement transmitting state from the input shaft 8 through the forward movement transmission system (the first transmission system) or the rearward movement system (the second transmission system) and the power is transmitted from the traveling clutch shaft 13 to the first traveling speed change shaft 14 through the main traveling speed change mechanism T1, the first traveling speed change shaft 14 drives the second speed change shaft 15 through the high and low speed selecting mechanism S in the high speed transmission or the low speed transmission, and further drives the traveling output shaft 17 through the substitute traveling speed change mechanism T2 so as to drive the rear wheel differential mechanism 92. In this embodiment, forward movement of 24 stages and rearward movement of 24 stages are made possible.

Furthermore, a swollen portion 2e is formed at the forward lower end of the rear transmission casing 2, and a mid PTO shaft 18 is journalled into the swollen portion 2a in parallel to the traveling output shaft 17, so that the gear trains and clutches of the front wheel driving system are disposed between the output shaft 17 and the mid PTO shaft 18. In other words, the driving gear 89 is fixed to the traveling output shaft 17 so as to permanently engage with a driven gear 90a freely fitted onto the front wheel driving shaft 18, and clutch teeth 90a is attached to the front end of driven gear 90. In front thereof, a clutch member 91 is fitted onto the front wheel driving shaft 18 in relation of being non-relatively-rotatable and freely longitudinally slidable, so as to be switched into the state of engaging with the clutch teeth 90a and that of disengaging therefrom. The front wheel driving shaft 18 is journalled at the rear end thereof onto the bearing wall 2b formed in the rear transmission casing 2 and at the front end to the swollen portion 2e and further projects forwardly, so as to connect with, for example, a transmission system with respect to the front wheel differential mechanism. When the clutch sleeve 91 engages with the clutch teeth 90a, the traveling vehicle loading thereon the transmission is four-wheel-driven, and, when disengaged, only the rear wheels are driven.

The respective shafts of PTO system and traveling system are journalled within the front and rear transmission casings 1 and 2 as the above-mentioned. For example, the input shaft 8 directly serves as the input shaft of PTO system and also as the input shaft of traveling system, the traveling clutch shaft 13, regarding the respective traveling system transmission shaft, is freely fitted onto the input shaft 8 coaxially of the input shaft 8, the first traveling output shaft 14 and second traveling speed change shaft 15 being coaxially disposed, and the low speed intermediate shaft 16 and traveling output shaft 17 being coaxially disposed. In the PTO system transmission shafts, the PTO clutch shaft 9; the PTO system transmission shaft at the downstream side of transmission of input shaft 8, is sequentially coaxially disposed at the rear of the input shaft 8 as discussed below.

Such the arrangement of the respective shafts of traveling system and PTO deletes disposal spaces of shafts in the entire transmission casing so as to contribute to construction of the compact transmission.

Next, explanation will be given on schematic construction of the entire PTO transmission system in accordance with FIG. 1. The input shaft 8 perforates the front bearing plate 4 and is journalled therethrough, perforates the bearing wall 1b, partition 1c and intermediate bearing plate 5, and can transmit at the rear end the power through the hydraulic multi--disc type PTO clutch D disposed in the third chamber R3 to the clutch shaft 9 extending coaxially and rearwardly of the input shaft 8.

The PTO clutch shaft 9 is braked in synchronism with disengagement of PTO clutch D by means of a hydraulic multi-disc type PTO brake E disposed just behind the PTO clutch D in order to prevent the PTO clutch shaft 9 from co-rotation when the PTO clutch D disengages. In other words, the input shaft 8 rotates integrally with the engage output shaft as the above-mentioned, but when the PTO clutch D engages, the PTO brake E is put in the not-braking state, so that the PTO clutch shaft 9 rotates integrally with the input shaft 8. On the other hand, when the PTO clutch D is disengaged the PTO clutch shaft 9, so that the PTO clutch shaft 9 is braked in the power cut-off state.

Figure 8:
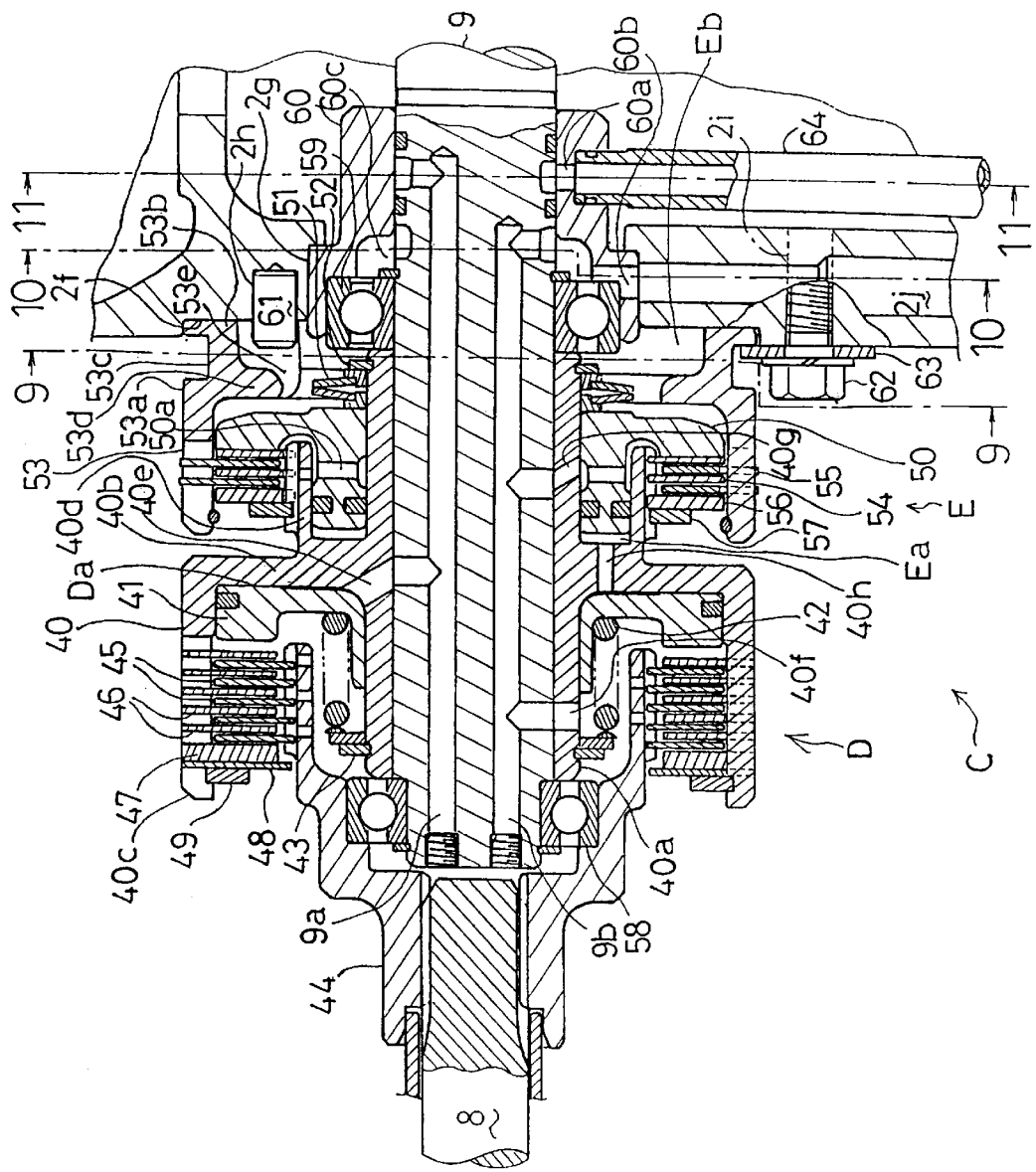
FIG. 8 is a sectional plan view of a PTO clutch and a PTO brake of the invention, which are mounted on a rear transmission casing 2.

In FIG. 8, the PTO clutch D and PTO brake E form an integrated PTO assembly C and can integrally be built-in, the PTO brake E being mounted onto the front surface of the bearing wall 2a of the rear transmission casing 2. The PTO clutch shaft 9 perforates the bearing wall 2a and is journalled thereto, further extends rearwardly, is journalled at the half way onto a bearing wall 2d and journalled at the rear end to the rear bearing cover 6. A rear PTO shaft 10 is journalled to the bearing wall 2d and rear bearing cover 6 in parallel to the PTO clutch 9, driving gears 93 and driven gears 94 of reduction gears fixed to the shafts 9 and 10 respectively permanently engage with each other between both the shafts 9 and 10 so as to form a PTO reduction gear train. The rear PTO shaft 10 projects rearwardly from the rear bearing cover 6 to enable the power to be transmitted to a working machine (for example, rotary cultivator) mounted onto the rear of tractor.

The schematic construction of the entire transmission is as described above. Next, explanation in detail will be given on an embodiment of forward and rearward movement selecting device A of the invention including the forward and rearward movement switching clutch B disposed in the first chamber R1 in accordance with FIGS. 1 through 7. Firstly, the second transmission system of gear train for rearward transmission, as shown in FIG. 6, is constructed such that a cylindrical portion for covering the outer periphery of the input shaft 8 is formed on the front surface and at about a lateral center of the bearing plate 4, the cylindrical portion extending slightly downwardly and one-sidedly so as to form an oil relaying unit 4a. Also, an idle shaft 11 is journalled to the lower portion of cylindrical portion as shown in FIG. 4.

Figure 3:
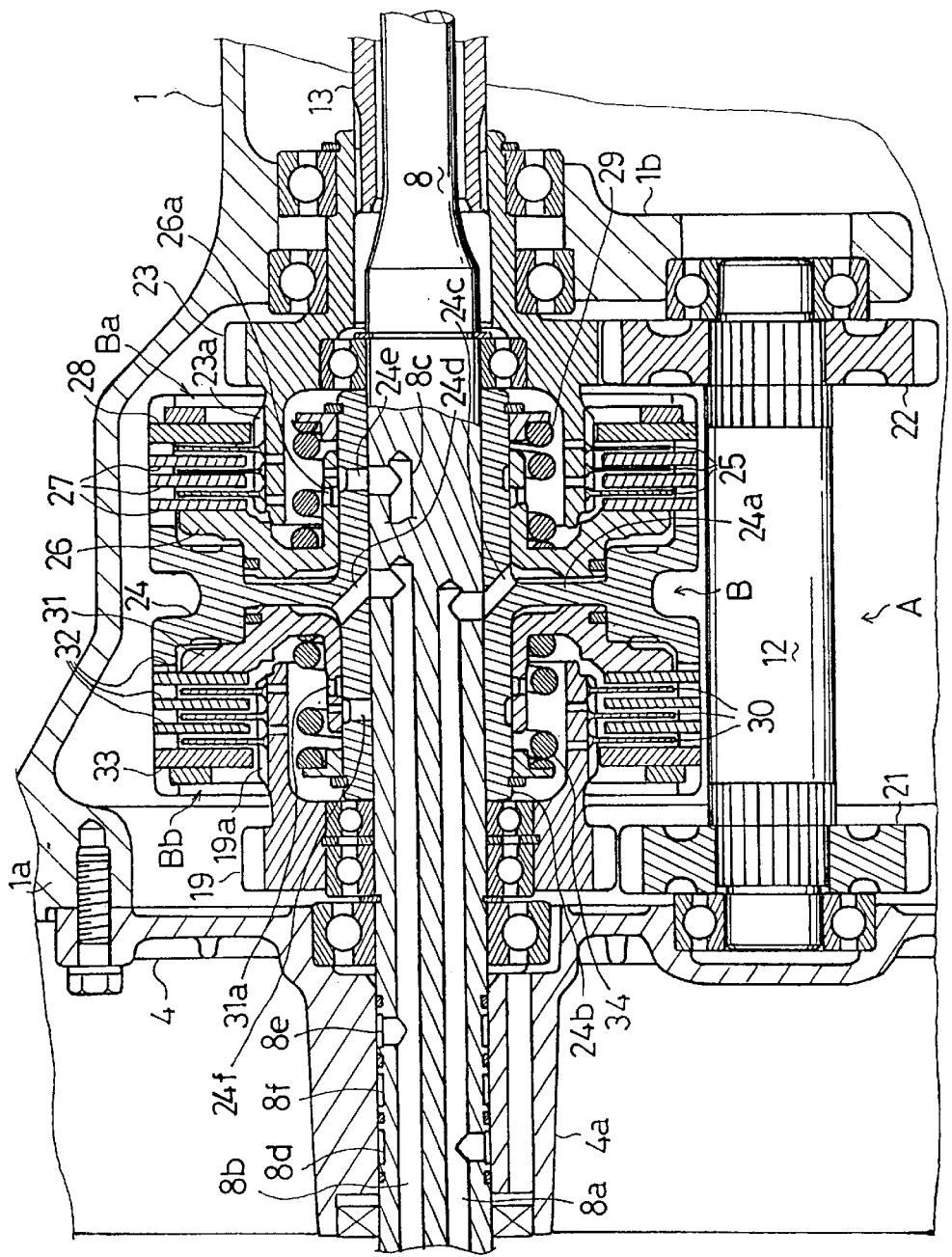
FIG. 3 is an enlarged principal portion in FIG. 2.
Figure 4:
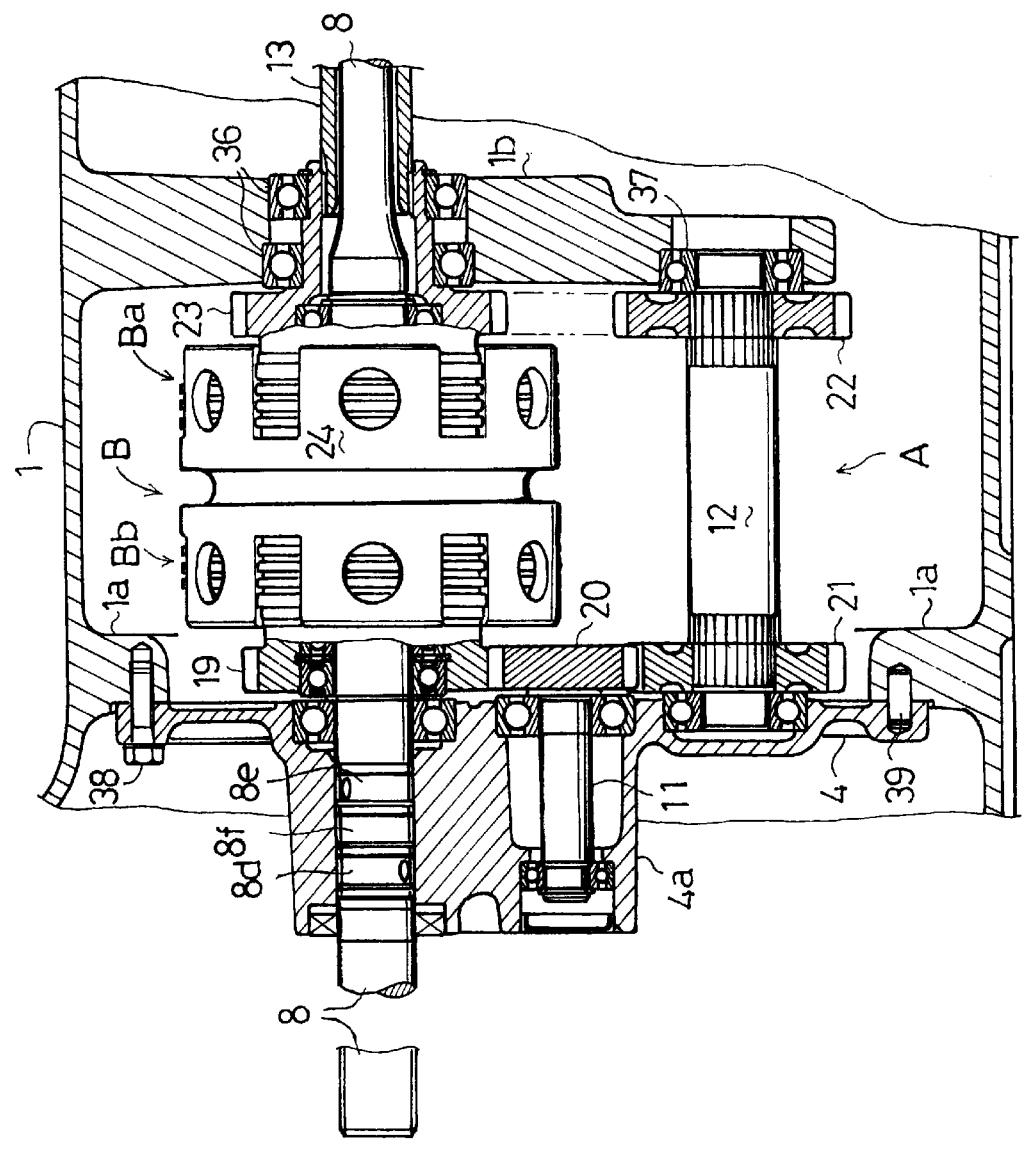
FIG. 4 is a developed sectional side view showing a gear train of the selecting device A.

A driving gear 19 for rearward movement is freely fitted onto the input shaft 8 in proximity to the inside surface of the front bearing plate 4, an idle gear 20 is fixed onto the idle shaft 11 as shown in FIG. 4, both the gears 19 and 20 being permanently engaged with each other. Furthermore, an intermediate shaft 12 for rearward movement, as shown in FIGS. 2 through 6, is journalled at the front end thereof to the front bearing plate 4, and a first intermediate gear 21 is fixed to the intermediate shaft 12 for rearward movement in proximity to the inside surface of the front bearing plate 4 and permanently engages with the idle gear 20. As shown in FIGS. 2 through 5, the traveling clutch shaft 13 coaxially disposed with the input shaft 8 and the rear end of the intermediate shaft 12 for rearward movement are journalled onto the bearing wall 1b. The driven gear 23 for switching the forward and rearward movements is freely fitted onto the input shaft 8 in proximity to the front end surface of bearing wall 1b. A second intermediate gear 22 is fixed to the intermediate shaft 12 for rearward movement, both the gears 22 and 23 permanently engaging with each other.

In addition, the driven gear 23 is journalled onto the bearing wall 1b and fixed to the front end of traveling clutch shaft 13 in spline connection.

Explanation will be given on the construction of forward and rearward movement switching clutch B in accordance with FIG. 3. The forward and rearward movement switching clutch B of hydraulic clutch system is covered by a cylinder casing 24, which has therein a partition 24a for longitudinally dividing the forward movement clutch unit Ba from the rearward movement clutch Bb, the input shaft 8 engaging through a key with a boss 24 provided at the center of partition 24a. Namely, the cylinder casing 24 integrally rotates with the input shaft 8.

A rear half portion of the cylinder casing 24 forms the partition 24a and is a clutch chamber forming the forward movement clutch unit Ba, and a boss of the driven gear 23 freely fitted onto the input shaft 8 extends into the clutch chamber. Splines 23a are formed on the outer periphery of the boss, the splines 23a longitudinally slidably engage with friction plates 25. A piston 26 is longitudinally slidably disposed between the friction plate 25 nearest to the partition 24a (at the foremost end) and the partition 24a, and a check plate 28 is fixed to the cylinder casing 24 in the vicinity of the rear end opening of the forward movement clutch unit Ba behind (outside) the outermost friction plate 25a. Between the friction plates 25 and between the rearmost friction plate 25 and the piston 26 are disposed spacers 27 respectively so as to longitudinally slidably engage with respect to the cylinder casing 24, the piston 26 being biased by a biasing spring 26 toward the partition 24a.

Meanwhile, a front half portion within the cylinder casing 24 before the partition 24a becomes a clutch chamber forming the rearward movement clutch unit Bb, into which chamber the boss of driving gear 19 extends, splines 19a are formed on the outer periphery thereof, and friction plates 30 longitudinally slidably engage with splines 19a. A piston 31 is longitudinally slidably disposed between the friction plate 30 closest to the partition 24a (at the rearmost end) and the partition 24a, and a check plate 33 is fixed to the cylinder casing 24 in the vicinity of the front end opening of the outermost (the foremost end) friction plate 30. Spacers 32 are disposed between the respective friction plates 30 and between the foremost end friction plate 30 and the piston 31 so as to longitudinally slidably engage with respect to the cylinder casing 24, the piston 31 being biased by a biasing spring 34 toward the partition 24a.

In the input shaft 8 are bored an operating oil passage 8a for forward movement, an operating oil passage 8b for rearward movement, and a lubricating oil passage 8c, which axially extend in parallel to each other. The operating oil passage 8a communicates through an oil passage 24c bored in the boss 24b with the pressurized chamber between the partition 24a and the piston 31. The operating oil passage 8b communicates through an oil passage 24d bored at the boss 24b with the pressurized chamber between the partition 24a and the piston 31. The lubricating oil passage 8c communicates through oil passages 24e and 24f bored at the boss 24b and orifices 26a and 31 a bored at the pistons 26 and 31 with the friction plates 25 and 30, spacers 27 and 32, and clutch units Ba and Bb.

When the operating oil is supplied through the operating oil passage 24c into the pressurized chamber of the piston 26, the piston 26 is pushed by the operating oil against the biasing spring 29 so as to leave the partition 24a to slide outwardly (rearwardly) and put the friction plates 25 and spacers 27 between the piston 26 and clutch plate 28 so as to be brought in press contact and so as to put the forward movement clutch into the engaging state, at which time the power by the input shaft 8 is directly transmitted to the traveling clutch shaft 13 through the first transmission system: the cylinder casing 24 and driven gear 23, the traveling clutch shaft 13 rotating in the same direction as the input shaft 8, that is, the forward movement direction of the vehicle body. In addition, in this state, the rearward movement clutch is in the disengaging state so as to cut-off transmission between the cylinder casing 24 integral with the input shaft 8 and the driving gear 19 always interlocking with the traveling clutch shaft 13 through the gear train, thereby cutting off power transmission of the second transmission system.

Meanwhile, when the operating oil is supplied into the pressurized chamber of the piston 31 through the operation oil passage 24d, the piston 31 is pushed by the operating oil against the biasing spring 34 so as to leave the partition 24a and slide outwardly (forwardly) to put the friction plates 30 and spacers 32 between the piston 31 and the check plate 33 and bring them in press contact with each other to put the rearward clutch in the engaging state, at which time the power from the input shaft 8 is transmitted through the cylinder casing 24, driving gear 19, idle gear 20 and first intermediate gears 21 and 22 to the forward and rearward movement switching driven gear 23, whereby the traveling clutch shaft 13 rotates reversely to the rotation of the input shaft 8, that is, in the rearward movement direction of the vehicle body, at which time the forward movement clutch disengages so as to cut-off the first transmission system from the cylinder casing 24 integral with the input shaft 8 to the driven gear 23.

Figure 5:
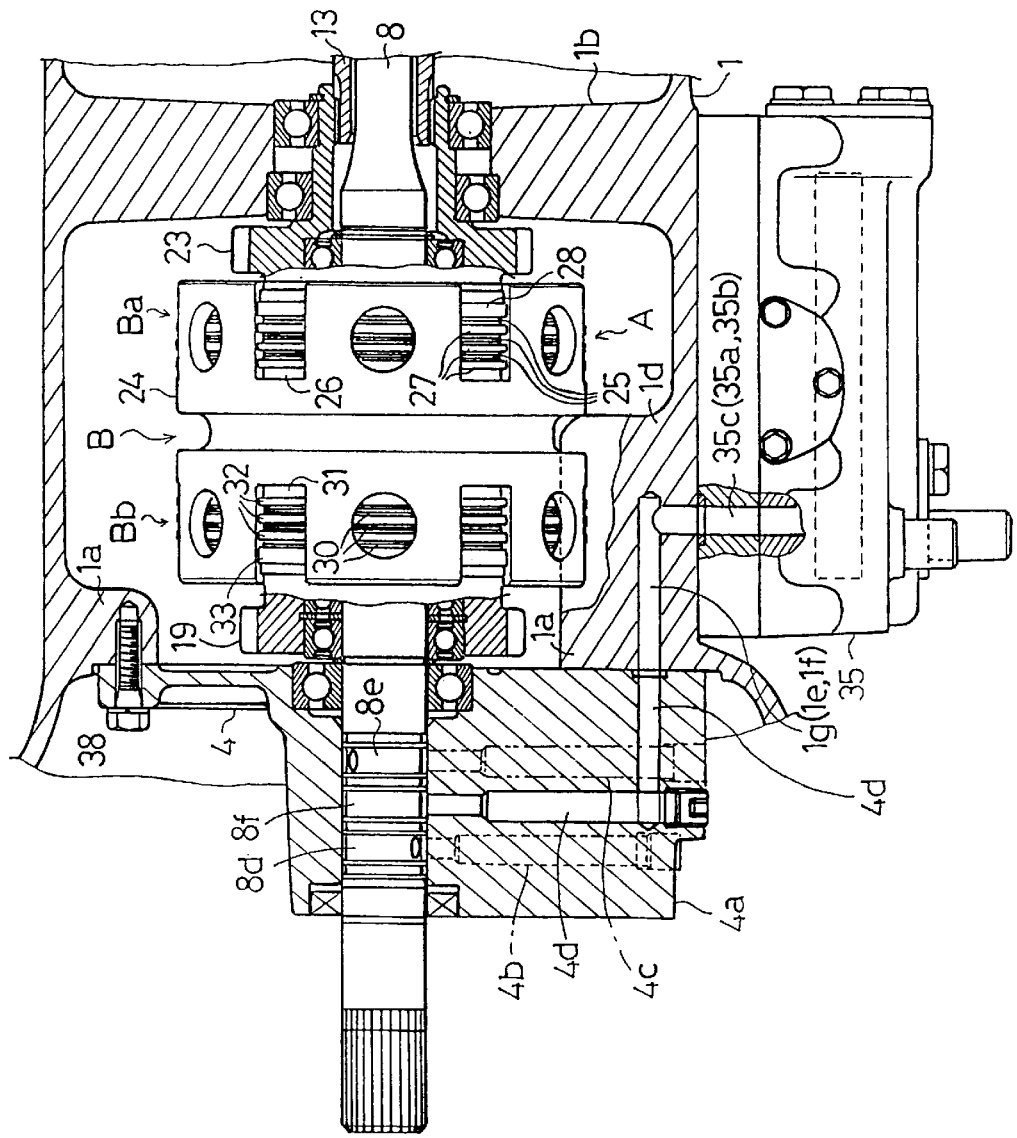
FIG. 5 is a developed partially sectional plan view showing structure of an oil passage with respect to the forward and rearward movement switching clutch B of the selecting device A.
Figure 6:
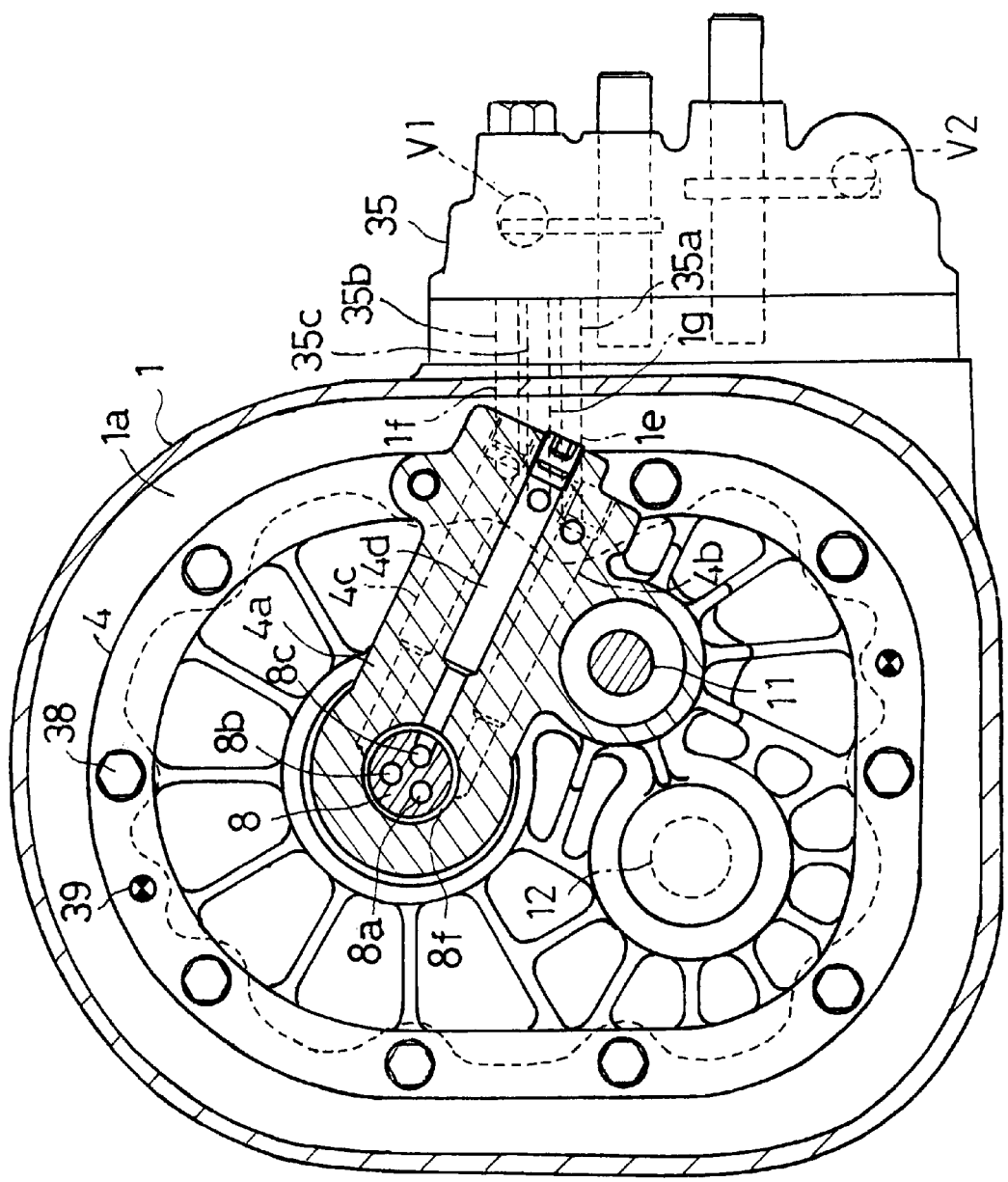
FIG. 6 is a view looking in the direction of the arrows 6—6 in FIG. 2.

A hydraulic control valve unit 35 for controlling the operating and lubricating oil with respect to the forward and rearward movement switching clutch B, as shown in FIGS. 5 and 6, is attached onto one side wall of the front transmission casing 1 so as to connect through pippins (not shown) with an external hydraulic pump. At the one side wall of the front transmission casing 1, a swollen portion 1d is formed on the boss 1a for fixing thereto the bearing plate 4. In the swollen portion 1d, a forward movement operating oil passage 1e, a rearward movement operating oil passage 1f and a lubricating oil passage 1g are bored in an L-like shape so as to open at the mounting surface of bearing plate 4 while communicating with a forward movement operating oil passage 35a, a rearward movement operating oil passage 35b and a lubricating oil passage 35c of the hydraulic control valve unit 35, respectively.

The front end surface of boss 1a connects with the rear surface of the front bearing plate 4 as described above, and the front end surface of the swollen portion 1d abuts against the rear end surface of front bearing plate 4 at a portion including the openings of forward movement operating oil passage 1e, rearward movement operating oil passage 1f and lubricating oil passage 1g. The abutting portion of the front bearing plate 4 is the rear end surface of the oil relaying unit 4a, on which are bored the respective openings of a forward movement operating oil passage 4c and a lubricating oil passage 4d bored in the L-like space in the oil relaying unit 4a, the openings communicating with the forward movement operating oil passage 1e, rearward movement operating oil passage 1f and lubricating oil passage 1g, respectively.

The other ends of forward movement oil passage 4b, rearward movement operating oil passage 4c and lubricating oil passage 4d at the oil relaying unit 4a, are axially disposed and open on the peripheral surface of the cover of the cylindrical portion of the input shaft 8 at the front bearing plate 4 and communicate with a forward movement operating oil port 8d, a rearward movement operating oil port 8e and a lubricating oil port 8f, respectively.

The hydraulic control valve unit 35 and the forward and rearward movement transmission including switching clutch B, communicate through a forward movement operating oil passage L1 (35a-1e-4b-8d-8a-24c), a rearward movement operating oil passage L2 (35b-1f-4c-8e-8b-24d) and a lubricating oil passage L3 (35c-1g-4d-8f-8c-24e-24f) in a manner of perforating the swollen portion 1D of front transmission casing 1, oil relaying unit 4a, input shaft 8, and boss 24b of cylinder casing 24, thereby executing control for supplying operating oil and lubricating oil with respect to the forward movement switching clutch B by controlling the hydraulic control valve unit 35.

Figure 7:
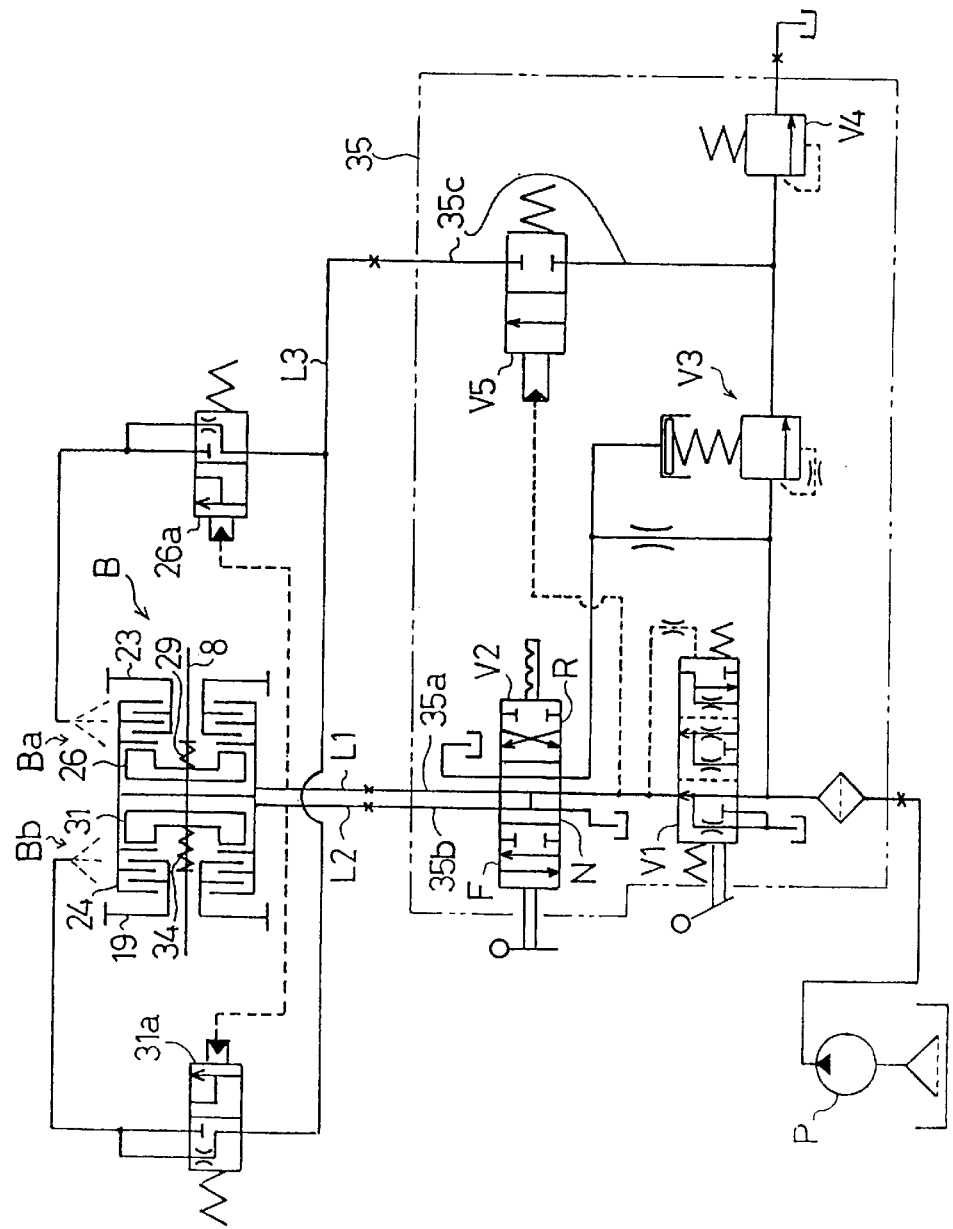
FIG. 7 is a circuit diagram of oil passages for operating oil and lubricating oil with respect to the forward and rearward movement switching clutch B.

Explanation will be given on the construction of hydraulic circuit in accordance with FIG. 7. Pressurized oil is supplied from an external hydraulic pump P to the hydraulic control valve unit 35 and at first, supplied to a F-N-R switching valve V2 within the hydraulic control valve unit 35 through an inching valve V1 switched by treading clutch pedal of the working vehicle, the forward and rearward movement operating oil passage 35a and 35b communicating through the F-N-R switching valve V2 with the respective forward and rearward movement oil passage L1 and L2 extend from the F-N-R switching valve V2. The inching valve V1, when the clutch pedal is not trod, sends discharged oil from the hydraulic pump P to the F-N-R switching valve V2, and drains operating oil in part through a throttle valve as the clutches trod to thereby reduce feed oil pressure, so that, when completely trod, the discharged oil from the hydraulic pump P is unloaded to discharge the operating oil from the forward and rearward movement switching clutch B.

The F-N-R switching valve is operated by, for example, a control lever attached in the vicinity of a handle of the working vehicle and switched into three positions of a forward movement position F, a rearward movement positions of R, and a neutral position N. In a case that the F-N-R switching valve V2 is in the forward position F, the operating oil is supplied to the forward movement clutch unit Ba through the forward movement operating oil passage 35a and L1 and the operating oil in the rearward movement clutch unit B is drained through the rearward movement operating oil passage L2 and 35b. On the other hand, in a case of rearward position R, the operating oil is supplied to the rearward movement clutch unit Bb through the rearward movement operating oil passages 35b and 12 and the operating oil in the forward movement clutch unit Bb is drained through the forward movement operating oil passages L1 and 35a.

Furthermore, in the hydraulic control valve unit 35, an oil passage is branched from the upstream side of inching valve V1 and a delay relief valve V3 is interposed therein, the valve V3 gradually becomes a valve closing state from a valve opening state when the operating oil rises up with respect to the forward and rearward movement switching clutch units B so as to rise pressure of the operating oil passage L1 or L2 up to the specified value, thereby automatically smoothly engaging the clutch units Ba and Bb with each other.

Furthermore, a lubricating oil passage 35c is branched to a relief drain oil circuit of delay relief valve V3 and a lubricating valve V4 is connected to the relief drain oil circuit. An open-close valve V5 of pilot pressure operation type is interposed in the lubricating oil passage 35c.

The open-close valve V5 is introduced therein with the operating oil guided from between the inching valve V1 and the F-N-R switching valve V2, so that, when the operating oil is pressurized to start the engagement of forward movement clutch Ba or the rearward movement clutch Bb, the open-close valve V5 is set to be put in an "opening position". The lubricating oil discharged from the open-close valve 5 communicates through the lubricating oil passages 35c and L3 with the orifices 26a and 31a. When the forward movement clutch unit Ba disengages, the orifice 26a communicates with the lubricating oil passage 24 bored in the boss 24b so that the lubricating oil is supplied to the clutch unit Ba. When the operating oil is supplied to the forward movement clutch unit Ba and the piston 26 slides in the direction of engaging the clutch, a sectional area of a communicating portion of the orifice 26a with the lubricating oil passage 24e gradually becomes larger so as to flow a large amount of lubricating oil into the forward clutch unit Ba. In the rearward movement clutch unit Bb, the orifice 31a bored in the hydraulic piston 31 and the lubricating oil passage 24f have the same relation as the above.

The construction of selecting device A is as described above. Next, explanation will be given on an assembly process of the forward and rearward selecting device A into the transmission casing 1, the device A being assembled with the front bearing plate 4 prior to the assembly into the front transmission casing 1. In detail, the input shaft 8 and idle shaft 11 are journalled to the front bearing plate 4, and the forward and rearward movement switching clutch B inclusive of the rearward movement driving gear 19 is disposed onto the input shaft 8, the driving gear 19 being put in the state of engaging with the idle gear 20. Furthermore, the rearward movement intermediate shaft 12 attached with the first and second intermediate gears 21 and 22 is journalled at the front end thereof to the front bearing plate 4, so as to allow the first intermediate gear 21 to engage with the idle gear 20 and the second intermediate gear 22 to engage with the driven gear 23.

Thus, the selecting device A, which temporarily build the forward and rearward movement clutch B in the front bearing plate 4, is inserted into the front transmission casing 1 through the front end opening (opening portion), the driven gear 23 freely fitted onto the input shaft 8 is built-in the bearings 36 mounted into the bearing wall 1b and journalled thereto, and the rearward movement intermediate shaft 12 is journalled at the rear end thereof to the bearing wall 1b through a bearing 37 built therein. In addition, at the rear end of the boss of driven gear 23 are formed internal tooth splines, so that the traveling clutch shaft 13 is inserted from the rear of bearing wall 1b into the driven gear 23 in a manner of trapping the input shaft 8, and the splines formed on the outer periphery of the front end of the traveling clutch shaft 13 engage with internal tooth splines of driven gear 23, thereby connecting the driven gear 23 to the traveling clutch shaft 13.

The front bearing plate 4 temporarily mounted onto the boss 1a through a positioning pin 29 and thereafter tightened by bolts 38 so as to complete the build-in of the selecting device A. In addition, the front bearing plate 4 is only mounted onto the boss 1a. The respective oil passages bored in the oil relaying unit 4a of front bearing plate 4 naturally communicate with the respective oil passages bored at the swollen portion 1d and boss 1a of the front transmission casing 1a. The selecting device A is constructed as described above. Next, explanation will be given to the structure and mounting construction of a PTO assembly C of PTO clutch D and PTO brake E of hydraulic type in the PTO transmission system in accordance with FIGS. 1 through 8.

Explanation will be given on assembling of PTO assembly C in accordance FIG. 8. The PTO clutch D and PTO brake E are coaxially assembled as the PTO assembly C. At first, a cylinder casing 40 for the PTO clutch C is described of its shape. At the center of cylinder casing 40 is formed a boss 40a through which the cylinder casing 40 is mounted through a key. A partition 40b is formed perpendicular to the rotational axis and an approximate longitudinal center of boss 40a. A cylindrical portion 40c for the clutch is formed forwardly of the outer peripheral surface of partition 40a, the cylindrical portion 40c and partition 40b forming a drum of the PTO clutch D. A space surrounded with the outer peripheral surface of boss 40a and cylindrical portion 40c is used as a pressurized chamber Da for clutch operation. A piston 41 is included longitudinally slidably in the pressurized chamber Da. A return spring 44 is interposed between the piston 43 and the stopper ring 45 fixed to the front end of boss 40a, thereby biasing the piston 43 toward the partition 40b.

When the input shaft 8 and PTO clutch shaft 9 are journalled in the predetermined positions and the PTO assembly C is disposed in the predetermined position on the PTO clutch shaft 9, the rear end of clutch member 44 fixed to the rear end of input shaft 8 is inserted into the cylinder casing 40 of PTO clutch D. Splines are formed on the outer periphery of clutch member 44, a plurality of friction plates 45 are non-relatively-rotatably and longitudinally slidably engaged with splines. Meanwhile, the friction plates 45 and spacers 46 are layered so as to engage with each other in the cylinder casing 40 in relation of being non-relative-rotatable and longitudinally slidable. A holder 47 engages with the cylindrical portion 40c outside the outermost friction plate 45 (at the foremost end), a check plate 48 engages with the cylindrical portion 40c outside the holder 48, and a stopper ring 49 is fixed to the outside surface of the check plate 48, so that the check plate 48 and holder 47 are prevented from outwardly forwardly escaping. Thus, the multidisc type PTO clutch C disposing therein a plurality of friction plates 45 and spacers 46 is formed.

A braking cylindrical portion 11d smaller in diameter than the cylindrical portion 40c rearwardly extends from the rear end surface of partition 40b, and splines are formed on the outer peripheral surface of the cylindrical portion 11d so as to non-relatively-rotatably and longitudinally slidably engage with a braked plate 54 to be discussed below. A space surrounded by the outer peripheral surface of boss 40a, cylindrical portion 40b and partition 40b, is used as a pressurized chamber Ea so that a piston 50 is longitudinally slidably inserted therein, a stopper ring 52 is fixed to the rear end of boss 40a, and two disc springs 51 are interposed between the stopper ring 52 and the piston 50, thereby biasing the piston 50 toward the partition 50b.

Furthermore, a brake drum 53 is disposed so as to enclose therein the piston 50. The brake drum for controlling the PTO brake E is drum-like shaped, and comprises a cylindrical portion 53a sleeved onto the PTO shaft 9 of braked member in a manner of enclosing the piston 50 and has the rear surface portion 53b formed radially of PTO clutch shaft, and an annular groove 53c is formed on the outer peripheral surface of cylindrical portion 53a in the vicinity of the rear surface portion 53b. A wall 53d extending radially of PTO clutch shaft 9 is formed within the cylindrical portion 53a so that a space positioned at the rear of wall 53d, surrounded by the cylindrical portion 53a forming the annular groove 53c, and extending to the rear surface portion 53b, is referred to as a idling-allowable chamber Eb. The idling-allowable chamber Eb is open at the rear end thereof on the rear surface portion 53b and the PTO clutch shaft 9 perforates through the opening. Also, in the same chamber Eb, the cylindrical portion 53a in part projects toward the center to form an abutting portion 53e for abutting against a stopper pin 61 to be discussed below.

The splines on the outer peripheral surface of cylindrical portion 40d at the cylinder casing 40 non-relatively-rotatably and longitudinally slidably engage a plurality of braked plates 54, and braking plates 55 non-relatively-rotatably and longitudinally slidably engage with the cylindrical portion 53a of brake drum 53 in a manner of being layered between the braked plates 54. Outside the outermost (at the foremost end portion) braking plate 55, a holder 56 engages with the splines of cylindrical portion 40d, and a stopper ring 57 is retained to the splines of cylindrical portion 40d just outside the holder 56 so that the holder 56 is prevented from escaping. Thus, in the brake drum 53, a plurality of braking plates 55 and braked plates 54 are disposed between the biasing portion of piston 50 and the holder 56 so as to construct the multidisc type PTO brake E.

On the front surface of bearing wall 2a of the rear transmission casing 2 serving as the mounting surface for the PTO assembly C is formed a recess 2f into which the rear surface portion 53b of brake drum 53 at the PTO brake E is relative-rotatably fitted, and an insertion bore 2g for inserting therein an oil relaying member 60 is a manner of longitudinally perforating. Furthermore, a pin hole 2h for inserting therein the stopper pin 61 is recessed at a portion of recess 2f, and a plurality of bolt bores 2i are provided on the outer periphery of recess 2f.

Figure 10:
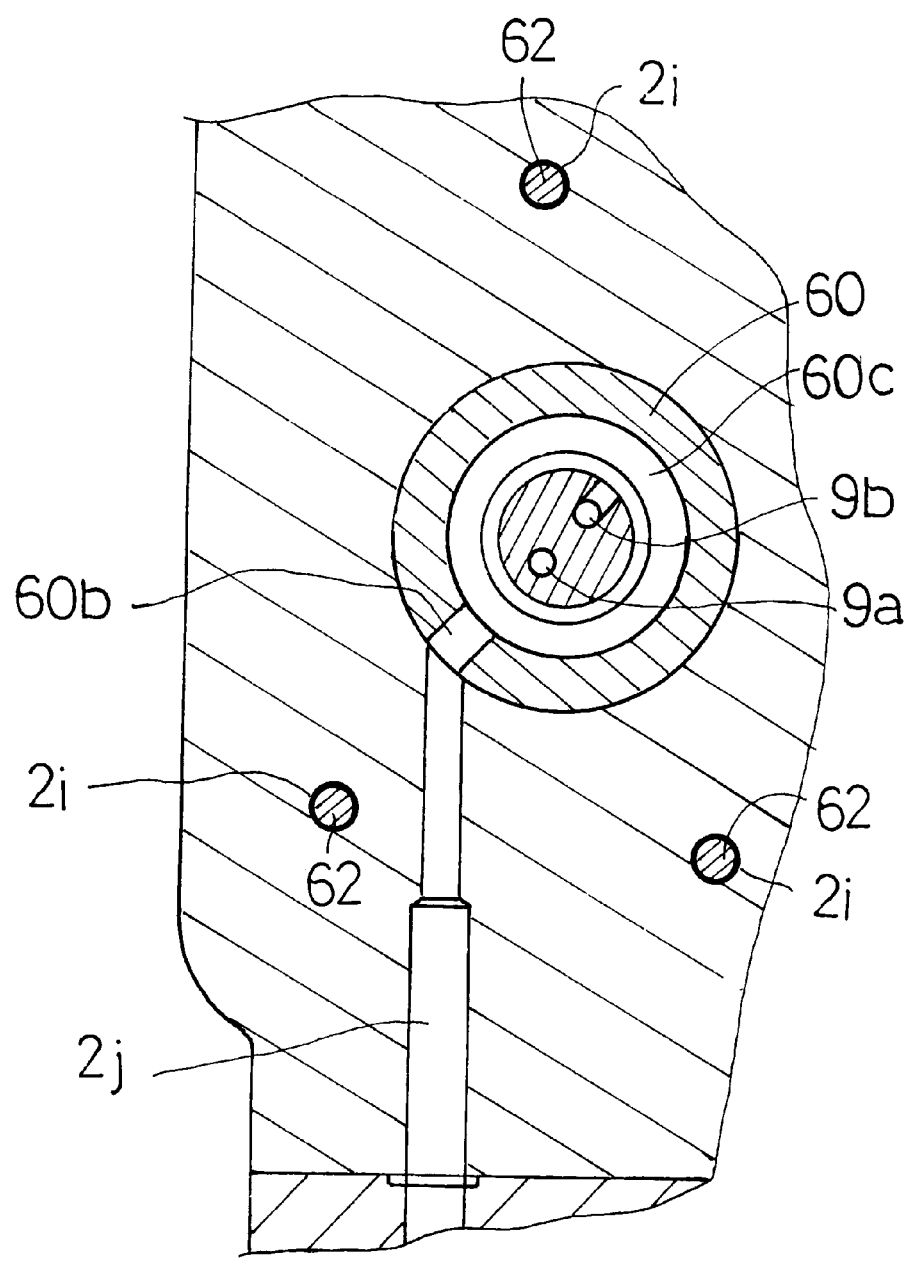
FIG. 10 is a sectional view looking in the direction of arrows 10—10 in FIG. 8.

Also, at the insertion bore 2g as shown in FIGS. 8 and 10, a lubricating oil passage 2i communicating with a PTO clutch controlling valve V attached onto the outer wall of the rear transmission casing 2 is bored.

Figure 11:
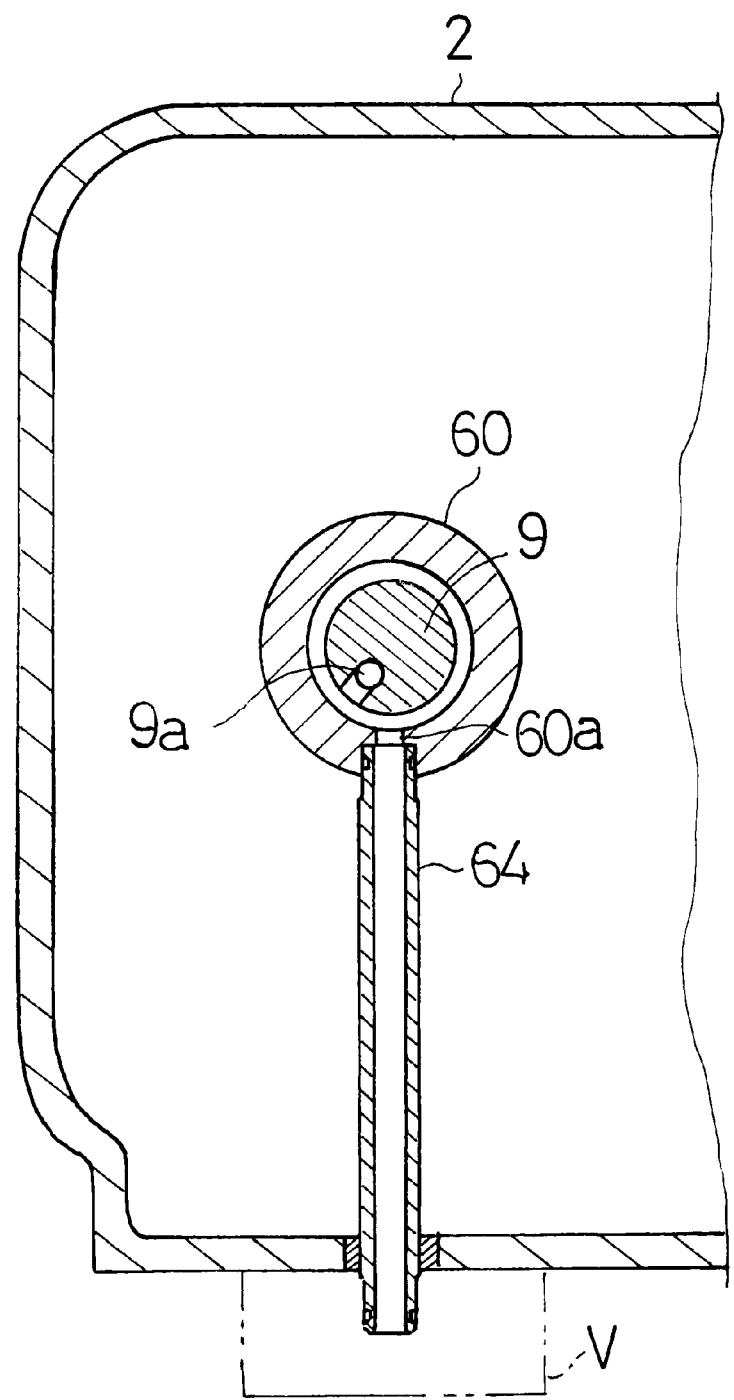
FIG. 11 is a sectional view looking in the direction of the arrows 11—11 in FIG. 8.

An oil relaying member 60, firstly, is non-rotatably inserted into the insertion bore 2g with respect to the bearing wall 2a, and PTO clutch shaft 9 is longitudinally perforated within the oil relaying member 60 through a bearing 59. In the oil relaying member 60 is formed an oil sump 60c in proximity to the bearing 59, and on the internally peripheral surface are open a clutch operating oil supply port 60a and a lubricating oil port 60b which communicates with the lubricating oil passage 2j. Also, an operating oil pipe 64 disposed in the rear transmission casing 2, as shown in FIGS. 8 and 11, connects with an oil output port from the PTO clutch controlling hydraulic valve V, the pipe end thereof connecting with the operating oil supply port 60a. The operating oil pipe 64 is mounted to prevent oil relaying member 60 from rotating.

Refer to FIGS. 8 and 10, the oil sump 60c of oil relaying member 60 communicates with the lubricating oil port 60b and with a lubricating oil passage 9b of PTO clutch shaft 9 to be discussed below. The lubricating oil is introduced into the lubricating oil passage 9b through the oil sump 60c and supplied as the lubricating oil for the PTO clutch D and PTO brake E.

Thus, the rear surface portion 53b of brake drum 53 is inserted into the recess 2f at the front end surface of bearing wall 2a fixing thereto the oil relaying member 60. The rear surface portion 53b abuts against the recess 2f within the recess 2f in an extent of allowing the brake drum 53 to be rotatable. Thus, when the rear surface portion 53b is fixed into the recess 2f, the inside surface of annular groove 53c is to coincide with the front end surface (except for the recess 2f) of bearing wall 2a. Mounting bolts 62 screwably engage with the respective bolt bores 2i provided around the recess 2f, and flange members 63 are inserted between the heads of mounting bolts 62 and the front end surface of bearing wall 2a. The flange member 63 in part projects into the annular groove 53c so as to prevent the brake drum 53 from escaping from the bearing wall 2a. In other words, movement of the brake drum 53 is regulated in the direction of rotating axis of PTO clutch shaft 9. In addition, the flange 63 does not strongly press the inside surface of annular groove 53c of brake drum 53, whereby the brake drum 53 is rotatably mounted onto the bearing wall 2a.

Figure 9:
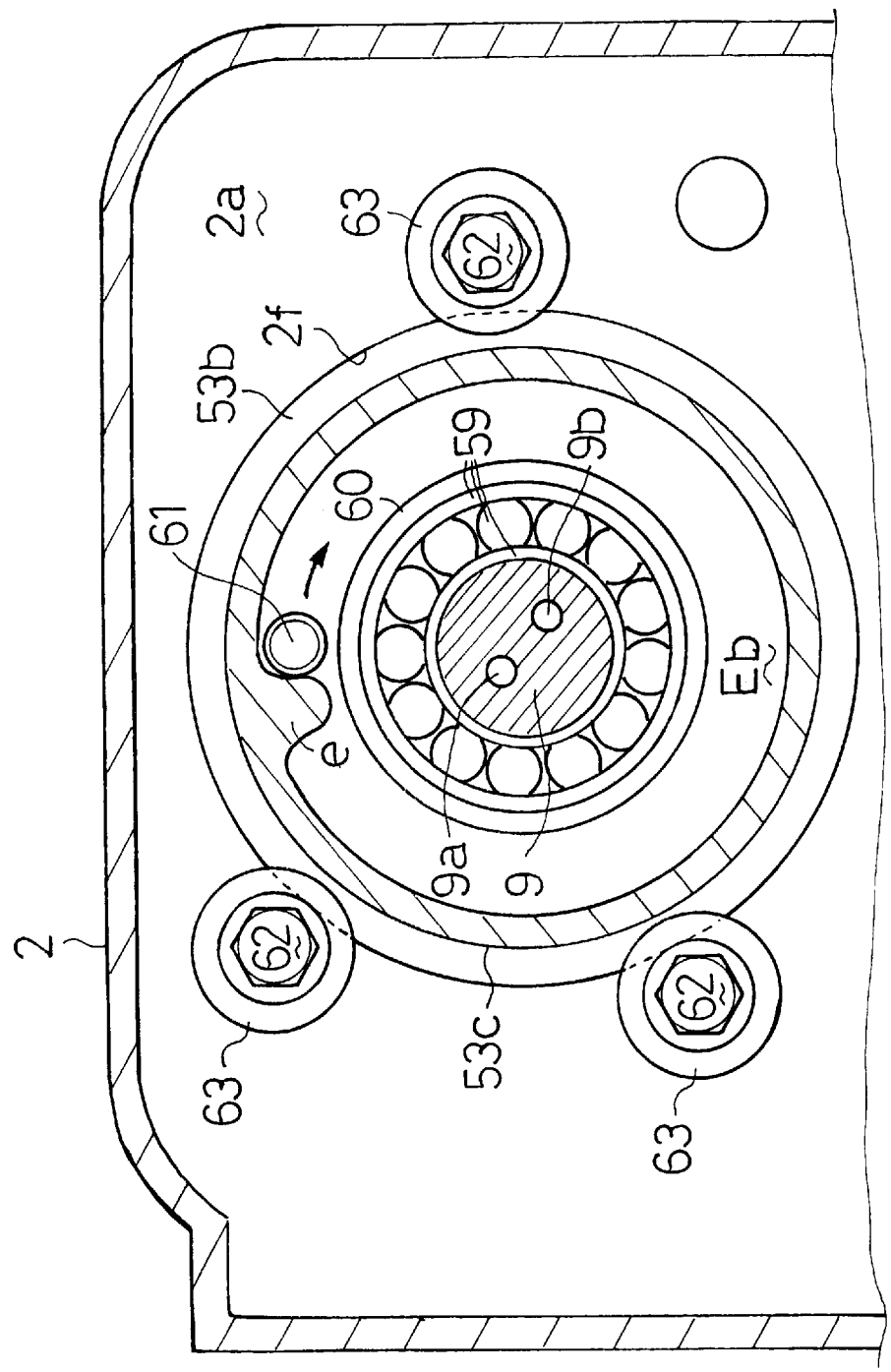
FIG. 9 is a sectional view looking in the direction of the arrows 9—9 in FIG. 8.

Within the recess Eb formed in the brake drum 53 thus mounted to the bearing wall 2a, the head of stopper pin 61 projects to said recess Eb as shown in FIGS. 8 and 9. As shown in FIG. 9, the abutting portion 53e formed with said brake drum 53, projects to said recess Eb, abuts against the stopper pin 61 at the head thereof and then rotates in the direction of the arrow until the same again abuts against the stopper pin, the relative rotation, i.e., brake drum 53 is allowed with respect to the bearing wall 2a. Accordingly, even in the state where the PTO clutch shaft 9 joins with the brake drum 53 of PTO brake E, the idling in a predetermined angle reversely to the driving direction is possible, whereby such idling facilitates the interlocking connection of rear PTO shaft 10 of the working vehicle and transmission mechanism at the working machine side.

At the point in time of mounting the PTO assembly C on the bearing wall 2a, the brake piston 50 is disposed in the brake operating oil chamber Ea in the brake drum 53. In the cylindrical portion 53a thereof, the braking plates 55 are engaged to be combined with the cylinder casing 40 so as to construct PTO brake E.

The rear surface portion 53a of brake drum 53 is mounted onto the bearing wall 2a. The boss 40a of cylinder casing 40 is mounted onto the PTO clutch shaft 9. A bearing 58 is fitted in position onto the front end of PTO clutch shaft 9. The boss 40a of clutch casing 40 is sandwiched between the bearings 58 and 59 so as to be fixed onto the PTO clutch shaft 9. The clutch member 44 spline-connected with the rear end of input shaft 8 is fitted with the bearing 58.

The friction plates 45 and spacers 46 engage with the splines on the rear end of clutch member 45 and cylindrical portion 40c of cylinder casing 40. The holder 47, the oil leak preventing plate 48 and stopper ring 49 fixedly engage with the cylindrical portion 40c, so as to complete the PTO clutch D and end assembly of PTO assembly C.

When the PTO assembly C is removed from the bearing wall 2a, firstly, the stopper ring 49 is removed, the output shaft 8 and clutch member 44 are forwardly moved from the PTO clutch shaft 9, the PTO clutch D is dismantled, the bearing 58 is removed, and the mounting bolts are removed, whereby the cylinder casing 40, as the pistons 41 and 50 are inwardly fitted, forwardly slide together with the brake drum of PTO brake E and can leave the PTO clutch shaft 9 and bearing wall 2a.

Lastly, explanation will be given on supplying structure of operating oil and lubricating oil with respect to the PTO assembly A in accordance with FIGS. 8 through 11. An operating oil passage 9a and a lubricating oil passage 9b are bored at the PTO clutch shaft 9 in parallel to each other and axially thereof. The operating oil passage 9a communicates with an operating oil pipe 64 through an operating oil port 60a of oil relaying member 60, so that the operating oil is guided from the oil output port of PTO clutch controlling hydraulic valve V into the operating oil passage 9a through the operating oil pipe 64 and operating oil port 60a.

The operating oil passage 9a communicates with the clutch operating oil chamber Da through the clutch operating oil port 40e bored at the boss 40a of cylinder casing 40. Meanwhile, the lubricating oil passage 9b communicates with the friction plates 45 and spacers 46 through a clutch lubricating oil port 40f bored at the boss 40a of cylinder casing 40 and also with the braked plates 54 and braking plates 55 through a brake lubricating oil port 40g bored at the boss 40a. A connecting oil passage 40h for connecting the clutch operating oil chamber Da and brake operating oil chamber Ea is bored at the partition 40b. In addition, a lubricating oil bore 50a is bored in the piston 50, and even when the piston moves in the braking direction, can communicate with the brake lubricating oil port 40g.

In the operating oil passage structured as described above, explanation will be given on a flow of operating oil when the PTO clutch is operated to engage from disengagement. At first, pressure oil discharged from the external hydraulic pump port is supplied from the oil output port of PTO clutch controlling hydraulic valve V into the operating oil pipe 64, and operating oil is guided into the clutch operating oil chamber Da through the operating oil port 60a of oil relaying member 60, operating oil passage 9a of PTO clutch shaft 9, and the operating oil port 40e for clutch at the cylinder casing 40, whereby the piston 41 forwardly slides against the return spring 42. Accordingly, the friction plates 45 and spacers 46 come in press contact between the piston 41 and the holder 47 and the PTO clutch D engages. In other words, the power from the input shaft 8 is transmitted from the clutch member 44 to the cylinder casing 40 and then to the PTO clutch shaft 9.

The operating oil in part introduced into the clutch operating oil chamber Da is introduced into the brake operating oil chamber Ea through the connecting oil passage 40d. The piston 50 pushed by the operating oil slides rearwardly against the disc spring 51 so that a space is formed between the piston 50 and the holder 56, the driven plates 54 move away from the braking plates 55 so as to put the PTO brake E in the non-braking state, and the PTO clutch shaft 9 receives the power from the input shaft 8 through the PTO clutch D without being braked by the PTO brake E.

Next, explanation will be given on a flow of operating oil when the PTO clutch C disengages. When the PTO clutch C disengages from the state of engaging the same, the PTO controlling hydraulic valve V stops oil supply to the operating oil pipe 64 and drains the oil. In other words, the pressure oil in the clutch operating oil chamber Da is drained through the clutch operating oil port 40*e*, operating oil passage 9*a*, operating oil port 60*a*, and operating oil pipe 64. Accordingly, the piston 41 rearwardly slides by a biasing force of return spring 42, whereby a space is formed between the holder 47 and the piston 41 and the friction plates 44 leave the spacers 45 to thereby disengage the PTO clutch D.

Simultaneously with the above, the operating oil is discharged from the interior brake operating oil chamber Ea to the operating oil passage 9*a* through the connecting oil passage 40*h*, clutch operating oil chamber Da and clutch operating oil port 40*e*, and the piston 50 forwardly slides by a biasing force of disc spring 51 so as to bring the braked plated 54 and braking plates 55 in press contact with each other between the holder 47 and piston 50 to thereby put the PTO brake E in the braking state. In other words, the PTO clutch shaft 9 is braked by the PTO brake E simultaneously with disengagement of PTO clutch D to cut off power from the input shaft 8 so that the rotation stops without co-rotation of PTO shaft 10, thereby avoiding co-rotation therewith.

When the PTO brake S exerts the braking action, the braking plates 55 rotate following the braked plates 54 when the former starts press contact with the latter, so that the brake drum 53 integral with the braking plates 55 rotate with respect to the bearing wall 2*a* by the co-rotation, where an angle of rotation thereof, as mentioned above, is regulated by the stopper pin 61 and abutting portion 53*e*, so that in the point of time when the abutting portion 53*e* abuts against the stopper pin 61, the brake drum 53 and braking plates 55 stop follow-up rotation to brake the braked plates 54.

Next, the lubricating oil, as shove in FIGS. 8 and 10, is properly introduced into the oil sump 60*c* in the oil relaying member 60 from the lubricating oil passage 2*i* thereof through the lubricating oil port 60*b* at the bearing wall 2*a* so as to lubricate the bearing 59 adjacent thereto, and further is supplied from the lubricating oil passage 9*b* into the cylinder casing 40 through the clutch lubricating oil port 40*f*. Such the supply of lubricating oil makes smooth the operation of PTO clutch D and PTO brake E so as to enable the respective braking friction members to be used for a long time.

The transmission mechanism of the invention for the working vehicle is constructed as described above. Next, explanation will be given on the effect of the present invention. The transmission construction provided with the traveling system and PTO system in which the bearing wall in the housing is formed, the hollow traveling system transmission shaft is journalled at one end thereof into the one side of bearing wall in the housing, the input shaft perforating the traveling system transmission shaft perforates the bearing wall to project toward the anti-traveling system transmission side. Also, the other end of the traveling system transmission shaft, the PTO system transmission shaft is coaxially drivingly connected to the input shaft perforating the traveling system transmission shaft. Therefore, the three shafts: the input shaft; traveling system transmission shaft; and PTO system transmission shaft, are coaxially disposed to reduce the disposal space required in the radial direction in comparison with the case of disposing them in parallel to each other. Accordingly, the compact transmission mechanism can be formed. In a case that the mechanical speed change device is included in the traveling system, the disposal space in the radial direction is apt to be larger in position of multistage speed change device, whereby the compact structure is effective in restricting the space in the radial direction of transmission shaft at the entire transmission mechanism. The housing containing therein these members also can be compact and contribute to a low manufacturing cost.

Next, in the traveling transmission system, when an auxiliary speed change device provided with at least two speed change stages is interposed between the engine and the traveling system speed change mechanism such as the main traveling speed change mechanism and substitute traveling speed change mechanism, one end thereof is rotatably supported together with coaxial traveling system transmission shaft onto the bearing wall formed in the housing, and journalled at the other end to the bearing plate, thereby completing with ease the assembly of auxiliary speed change device. The bearing plate is detachably mounted, so that the one end in the state where the bearing plate is removed, the one end of auxiliary speed change device can easily built in the bearing wall through the opening at the housing. Thereafter, the bearing plate is disposed at the opening, whereby the other end of auxiliary speed change device is easily journalled to the bearing plate, thus facilitating detachable mounting of the bearing plate, and also maintenance. The auxiliary speed change device is more easily assembled than the conventional speed change mechanism, and is independent of the other speed change mechanism so as to be disposed between the bearing wall and the bearing plate. Therefore, the auxiliary speed change device can be detachably mounted independently of the other speed change mechanism, simplifying assembly and maintenance.

The auxiliary speed change device has the first transmission system directly transmitting the power from the input shaft to the output shaft and the second transmission system for transmitting the power from the input shaft to the output shaft through the intermediate shaft, whereby, for example, in the case that the auxiliary speed change device is used as the selecting device, the first transmission system is used as the forward movement transmission system and the second transmission system can be used as the rearward movement transmission system by interposing the idle shaft between the intermediate shaft and the input shaft or the output shaft. In a case that the auxiliary speed change device is used as the high and low speed selecting device, the first transmission system is used as the high speed transmission system and the second transmission system forms the reduction gear train through the input shaft, intermediate shaft and output shaft, so as to be used as the low speed transmission system. Such the auxiliary speed change device provided with the first and second transmission system can easily be detachably mounted to the housing as the integral assembly.

The second transmission system of the auxiliary speed change device is provided with the idle gear to serving as the transmission system for reversely transmitting the rotation of input shaft to the output shaft through the idle gear so as to travel the auxiliary speed change device to be used as the selecting device which uses the first transmission system as the normal rotation transmission system and the second transmission system as the reverse rotation transmission system. Also, the idle gear can be journalled by using the bearing plate so that the gear train of second transmission system can compactly and easily be formed.

The auxiliary speed change device is provided with the hydraulic clutch alternatively switchable of the first or second transmission system into the transmission state by operating the hydraulic control valve, and forms, in the bearing plate, the oil relaying unit for fluid-communicating between the hydraulic clutch and the hydraulic control valve disposed outside the housing for switching the hydraulic clutch, so that the first and second transmission systems of the auxiliary speed change device can be selected by the hydraulic clutch, whereby the clutch engagement when the transmission system is selected, can be smooth and easy. Also, the oil relaying unit is formed by use of the bearing plate so as to lead to saving of the number of parts and simplification of structure.

Both the hydraulic clutches for the first and second transmission systems are provided onto the input shaft, whereby the hydraulic clutch can be reduced in capacity and auxiliary speed change device can be compact as a whole.

Regarding the structure of oil passage with respect to the hydraulic clutch, the hydraulic control valve is mounted onto the outer wall of housing, the oil passage communicating with the hydraulic control valve is formed in a thick portion of the outer wall, and the thick portion of the outer wall of housing joins with the bearing plate, so that the oil passage communicates with the oil relaying unit, and the oil passage communicates, with the oil relaying unit, whereby the hydraulic control valve and hydraulic clutch are automatically connected following assembly of bearing plate during the assembly of auxiliary speed change device, thereby saving labor required for piping.

Next, regarding the PTO transmission system, the drum, which retains in a predetermined condition the braking member of the PTO brake, is disposed coaxially with the PTO system transmission shaft and its rear surface portion is mounted onto the wall in the transmission casing, the braking members are allowed to be idle only in a predetermined angle around the axis of rotation of braked member, thereby facilitating connection of the PTO shaft of the working vehicle and the transmission mechanism at the working machine side.

Namely, the mechanism of the braking member with respect to the braked member of the PTO brake in order to facilitate such connection of PTO shaft of working vehicle with transmission mechanism at the working machine side, is not formed by processing the wall of the housing, but uses the drum body itself non-relatively rotatably retained to the braking members. The drum is mounted onto the wall portion in the transmission casing by use of the first and second retaining means of separate structure, so as to allow idling in a predetermined angle around the axis of rotation (not movable in the direction of axis of rotation), whereby a processing cost to the wall portion of housing is reduced and the idling mechanism can be constructed with ease.

Also, an annular groove is formed as the first retaining means on the outer periphery of brake drum. The rear surface portion of brake drum is screwably mounted only by mounting bolts so that the flange between the heads of bolt directly prevent the brake drum from escaping, that is, the drum is regulated of movement in the direction of axis of rotation. Thus, the bolts for mounting the brake drum to the wall surface are directly used as the first retaining means, thereby leading to saving of the number of parts.

Furthermore, in this construction, the second retaining means comprises the first projection provided on the wall portion, the recess which is provided on the rear surface of the braking member of the PTO brake and into which the first projection is fittable, and the second projection which projects toward the axis of rotation from the inner periphery of the recess and can abut against the first projection. The recesses are only formed onto the wall portion itself, the first projection and insertion bore for the first projection, thereby simplifying the shape and facilitating the processing. The second projection is formed at the drum body side so that the drum body only is mounted on the wall, whereby the idling allowable mechanism of the predetermined rotary angle with respect to the braked members to non-relatively-rotatably retain the braking members is directly formed, so as to facilitate assembly of mechanism.

Also, in the PTO transmission device of the working vehicle combined with the PTO clutch and the PTO brake, the clutch piston and brake piston are provided therein respectively, so that the hydraulic clutch and brake can be formed, thereby obtaining durable clutches and brakes which smoothly respond to the clutch engaging and disengaging and the brake exertion and inaction.

Also, among them, the PTO clutch operating oil chamber and PTO brake operating oil chamber are juxtaposed along the axis of rotation of the braked members to provide a compact PTO transmission mechanism while providing the brake mechanism for preventing follow-up rotation.

Furthermore, in such a construction, the oil relaying unit is disposed reversely to the bearing for journalling the rotary shaft of the braked member, thereby assembling the PTO clutches and PTO brakes to facilitate detachably mounting thereof with respect to the wall portion of transmission casing.

Although several embodiments have been described, they are merely exemplary of the invention and not to be construed as limiting, the invention being defined solely by the appended claims.

What is claimed is:

1. A transmission mechanism for a working vehicle, provided with an input shaft, comprising:
   a traveling system transmission shaft which is hollow and is disposed coaxially of said input shaft and allows said input shaft to perforate said transmission shaft;
   a PTO system transmission shaft disposed coaxially with said input shaft and connected in a driving manner to said input shaft projecting from the interior of said traveling system transmission shaft; and
   an auxiliary speed change device constructed between said input shaft and said traveling system transmission shaft.

2. A transmission mechanism for a working vehicle as set forth in claim 1, wherein said input shaft is journalled to a bearing plate for closing an opening of a housing and said auxiliary speed change device can be built in said housing through said opening in a state where said auxiliary speed change device is temporarily mounted to a bearing plate.

3. A transmission mechanism for a working vehicle as set forth in claim 2, wherein said auxiliary speed change device includes:
   an intermediate shaft which extends in parallel to said input shaft and said traveling system transmission shaft, said intermediate shaft being supported at one end to a bearing wall and at another end to said bearing plate,
   a first transmission system directly transmittable from said input shaft to said traveling system transmission shaft, and a second transmission system transmittable from said input shaft to said traveling system transmission shaft through said intermediate shaft, so that said first transmission system or said second transmission system is made selectable.

4. A transmission mechanism for a working vehicle as set forth in claim 3, wherein said second transmission system has an idle gear supported to said bearing plate so as to rotate said traveling system transmission shaft reversely to said input shaft.

5. A transmission mechanism for a working vehicle as set forth in claim 3, which further comprising a hydraulic control valve, wherein said auxiliary speed change device is provided with a hydraulic clutch which can alternatively switch said first or second transmission system in a transmitting state by operating said hydraulic control valve, and in said bearing plate, an oil relaying unit for fluid-communicating between said hydraulic clutch and said hydraulic valve disposed for switching said hydraulic clutch in order to switch said hydraulic clutch.

6. A transmission mechanism for a working vehicle as set forth in claim 4, further comprising a hydraulic control valve, wherein said auxiliary speed change device is provided with a hydraulic clutch which can alternatively switch said first or second transmission system in a transmitting state by operating said hydraulic control valve, and in said bearing plate, an oil relaying unit for fluid-communicating between said hydraulic clutch and said hydraulic valve disposed for switching said hydraulic clutch in order to switch said hydraulic clutch.

7. A transmission mechanism for a working vehicle as set forth in claim 5, wherein said hydraulic clutch is disposed on said input shaft.

8. A transmission mechanism for a working vehicle as set forth in claim 5, wherein
said hydraulic control valve is mounted onto an outer wall of said housing,
and oil passage communicating with said hydraulic control valve is formed in said outer wall, and said housing joints with said bearing plate so that said oil passage communicates with said oil relaying unit.

9. A transmission mechanism for a working vehicle as set forth in claim 6, wherein
said hydraulic control valve is mounted onto an outer wall of said housing,
and oil passage communicating with said hydraulic control valve is formed in said outer wall, and said housing joints with said bearing plate so that said oil passage communicates with said oil relaying unit.

10. A transmission mechanism for a working vehicle as set forth in claim 7, wherein
said hydraulic control valve is mounted onto an outer wall of said housing,
and oil passage communicating with said hydraulic control valve is formed in said outer wall, and said housing joints with said bearing plate so that said oil passage communicates with said oil relaying unit.

11. A transmission mechanism for a working vehicle as set forth in claim 1, wherein
a PTO clutch for on-off power transmission between said input shaft and said PTO system transmission shaft is disposed between said input shaft and said PTO system transmission shaft,
a PTO brake for braking said PTO system transmission shaft in accordance with disengagement of said PTO clutch is provided, said PTO brake comprising;
a drum member disposed around said PTO system transmission shaft and one surface portion of said drum body is mounted to said housing,
braking members retained to said drum member in relation of being axially slidable of said PTO system transmission shaft and non-relatively-rotatable,
braked members, which are brought into press contact with and moved away from said braking members following sliding motion of said braking members, and are fixed to said PTO system transmission shaft;
a first retaining means disposed between said rear surface portion of said drum body and said housing which allows said drum body to relatively-rotate around the axis while restricting movement in the axial direction of said PTO system transmission shaft; and
a second retaining means disposed between said rear surface portion of said drum body and said housing for allowing said drum body to be idle only in a predetermined angle around said axis.

12. A transmission mechanism for a working vehicle as set forth in claim 11, wherein said first retaining means comprises:
an annular groove formed on the peripheral surface of said drum body;
mounting bolts screwably mounted to said housing; and
a flange provided on a head of each of said mounting bolts and perforating into said annular groove.

13. A transmission mechanism for a working vehicle as set forth in claim 11, wherein said second retaining means comprises:
a first projection provided on said housing;
a recess provided on said rear surface portion of said drum body for fitting said first projection into said recess; and
a second projection which axially projects from the inner periphery of said recess and can abut against said first projection.

14. A transmission mechanism for a working vehicle as set forth in claim 12, wherein said second retaining means comprises:
a first projection provided on said housing;
a recess provided on said rear surface portion of said drum body for fitting said first projection into said recess; and
a second projection which axially projects from the inner periphery of said recess and can abut against said first projection.

15. A transmission mechanism for a working vehicle as set forth in claim 1, wherein:
between said input shaft and said PTO system transmission shaft is a disposed hydraulic type clutch for on-off power transmission between said input shaft and said PTO system transmission shaft;
between said PTO clutch and said housing is provided a hydraulic type PTO brake for braking said PTO system transmission shaft interlocking with said PTO clutch when disengaged;
said PTO clutch is provided with a piston biased by a spring toward the clutch disengagement side and operated by engagement of clutch against a biasing force of said spring when operating oil is supplied; and
said PTO brake is provided with a piston which is operated to cut the brake by receiving operating oil when said PTO clutch engages and is stopped of supply of operating oil so as to be biased by said spring toward the brake exertion side.

16. A transmission mechanism for a working vehicle as set forth in claim 15, further comprising:
- brake members coaxially fixed on said PTO system transmission shaft;
- a partition formed on said braked members so as to be approximately perpendicular to said PTO transmission shaft; and
- an operating oil chamber for said PTO clutch and an operating oil chamber for said PTO brake juxtaposed axially of said PTO system transmission shaft, wherein
- said pistons are contained in said respective operating oil chamber, and
- said partition is provided with an oil passage for mutually connecting between both of said operating oil chambers.

17. A transmission mechanism for a working vehicle as set forth in claim 16, which includes an oil relaying unit for supplying operating oil from a hydraulic control valve to said respective operating oil chambers, said oil relaying unit being disposed on the reverse side of said brake members with respect to a bearing journalling therewith said PTO system transmission shaft.

* * * * *